United States Patent
Wong et al.

(10) Patent No.: US 11,032,743 B1
(45) Date of Patent: Jun. 8, 2021

(54) METHODS AND APPARATUS FOR SUPPORTING DEVICES OF DIFFERENT TYPES USING A RESIDENTIAL GATEWAY

(71) Applicant: Charter Communications Operating, LLC, St. Louis, MO (US)

(72) Inventors: Curt Wong, Bellevue, WA (US); Yildirim Sahin, Englewood, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/699,640

(22) Filed: Nov. 30, 2019

(51) Int. Cl.
*H04W 28/24* (2009.01)
*H04W 28/26* (2009.01)
(Continued)

(52) U.S. Cl.
CPC ......... *H04W 28/24* (2013.01); *H04L 12/5601* (2013.01); *H04L 12/66* (2013.01);
(Continued)

(58) Field of Classification Search
CPC . H04L 12/5006; H04L 12/5601; H04L 12/66; H04L 61/2015; H04L 63/0892;
(Continued)

(56) References Cited

U.S. PATENT DOCUMENTS 8,094,663 B2 * 1/2012 Voit .................... H04L 63/0892
370/395.2
8,127,136 B2 * 2/2012 Yun ................... H04W 12/0602
713/171
(Continued)

FOREIGN PATENT DOCUMENTS

AU 2017328040 A1 * 2/2019 ...... H04W 12/04033
BR 112019004865 A2 * 6/2019 ...... H04W 12/04033
(Continued)

OTHER PUBLICATIONS

3rd Generation Partnership Project, Technical Specification Group Services and System Aspects, Wireless and wireline convergence access support for the 5G System (5GS) (Release 16), Sep. 2019, Technical Specification 23.316, Version 16.1.0 (Year: 2019).*
(Continued)

*Primary Examiner* — Eric Nowlin
(74) *Attorney, Agent, or Firm* — Straub & Straub; Michael P. Straub; Stephen T. Straub

(57) ABSTRACT

Methods and apparatus for providing bandwidth which can be used to support network connectivity and to obtain services from elements in a network, e.g., 5G network, are described. In various embodiments a DOCSIS link is connects a residential gateway at a customer premises to devices outside the customer premises, e.g., to devices in a 5G network or another network. Devices which support EAP authentication are provided with their dedicated bandwidth over the DOCSIS link. Devices which do not support EAP authentication, e,g, WiFi devices, share bandwidth to which a subscriber residing at the customer premise subscribes. Devices which support EAP authentication are provided reserved resources corresponding to a subscription associated with the individual device thereby allowing a user of a device which supports EAP authentication to obtain more bandwidth than is normally provided to a visited premises based on the service subscription associated with the visiting device.

20 Claims, 18 Drawing Sheets

(51) Int. Cl.
| | |
|---|---|
| *H04W 88/16* | (2009.01) |
| *H04L 12/24* | (2006.01) |
| *H04L 12/66* | (2006.01) |
| *H04W 12/06* | (2021.01) |
| *H04L 29/12* | (2006.01) |
| *H04L 29/06* | (2006.01) |
| *H04L 12/54* | (2013.01) |
| *H04L 12/70* | (2013.01) |

(52) U.S. Cl.
CPC ...... *H04L 41/5006* (2013.01); *H04L 61/2015* (2013.01); *H04L 63/0892* (2013.01); *H04L 63/123* (2013.01); *H04L 63/162* (2013.01); *H04W 12/06* (2013.01); *H04W 28/26* (2013.01); *H04W 88/16* (2013.01); *H04L 2012/5618* (2013.01)

(58) Field of Classification Search
CPC ............... H04L 63/123; H04L 63/162; H04L 2012/5618; H04W 12/06; H04W 28/24; H04W 28/26; H04W 88/16
See application file for complete search history.

(56) References Cited

U.S. PATENT DOCUMENTS

| | | | | |
|---|---|---|---|---|
| 8,140,054 | B2* | 3/2012 | Park | H04L 69/22 455/411 |
| 8,189,567 | B2* | 5/2012 | Kavanagh | H04L 61/2015 370/352 |
| 8,495,713 | B2* | 7/2013 | Krishnan | H04L 63/0884 726/5 |
| 8,615,017 | B2* | 12/2013 | Kato | H04W 92/02 370/401 |
| 8,745,253 | B2* | 6/2014 | Absillis | H04L 63/08 709/230 |
| 8,953,601 | B2* | 2/2015 | Kaippallimalil | H04L 29/12028 370/392 |
| 9,112,909 | B2* | 8/2015 | Kaippallimalil | H04L 63/102 |
| 9,204,473 | B2* | 12/2015 | Wang | H04W 48/08 |
| 9,226,153 | B2* | 12/2015 | Gaspar | H04W 12/06 |
| 9,344,890 | B2* | 5/2016 | Faccin | H04W 48/00 |
| 9,392,494 | B2* | 7/2016 | Hawkes | H04L 61/203 |
| 9,398,470 | B2* | 7/2016 | Roeland | H04M 15/66 |
| 9,693,266 | B2* | 6/2017 | Cherian | H04L 61/2015 |
| 9,712,489 | B2* | 7/2017 | Yadav | H04L 61/2061 |
| 9,713,181 | B2* | 7/2017 | Wang | H04W 48/08 |
| 9,736,157 | B2* | 8/2017 | Li | H04L 12/14 |
| 9,825,937 | B2* | 11/2017 | Ahmavaara | H04W 12/0609 |
| 9,942,927 | B2* | 4/2018 | Wang | H04L 12/06 |
| 10,212,594 | B2* | 2/2019 | Liu | H04W 12/08 |
| 10,257,158 | B2* | 4/2019 | Yadav | H04L 61/2061 |
| 10,257,868 | B2* | 4/2019 | Wang | H04L 12/06 |
| 10,397,211 | B2* | 8/2019 | Zou | H04L 63/0876 |
| 10,425,448 | B2* | 9/2019 | Tevlin | H04W 12/0609 |
| 10,433,163 | B2* | 10/2019 | Lee | H04W 12/0609 |
| 10,568,152 | B2* | 2/2020 | Wang | H04W 88/08 |
| 10,609,556 | B2* | 3/2020 | Ben Henda | H04L 63/08 |
| 10,716,002 | B2* | 7/2020 | Rajadurai | H04W 12/06 |
| 10,750,350 | B1* | 8/2020 | Gundavelli | H04W 8/26 |
| 10,791,093 | B2* | 9/2020 | Klein | H04L 63/0876 |
| 2006/0268856 | A1* | 11/2006 | Voit | H04L 63/0838 370/389 |
| 2007/0214270 | A1* | 9/2007 | Absillis | H04L 61/2015 709/227 |
| 2007/0217610 | A1* | 9/2007 | Yegani | H04L 63/162 380/270 |
| 2010/0107231 | A1* | 4/2010 | Kavanagh | H04L 9/3213 726/7 |
| 2010/0146599 | A1* | 6/2010 | Padmanabha | H04L 63/105 726/5 |
| 2010/0189052 | A1* | 7/2010 | Kavanagh | H04L 29/12915 370/329 |
| 2011/0173678 | A1* | 7/2011 | Kaippallimalil | H04L 63/162 726/4 |
| 2011/0283344 | A1* | 11/2011 | Krishnan | H04L 63/0884 726/5 |
| 2011/0286396 | A1* | 11/2011 | Kato | H04W 92/02 370/328 |
| 2012/0020343 | A1* | 1/2012 | Sugizaki | H04W 48/17 370/338 |
| 2012/0265888 | A1* | 10/2012 | Roeland | H04L 12/1403 709/228 |
| 2013/0288644 | A1* | 10/2013 | Schroeder | H04W 8/06 455/411 |
| 2015/0016415 | A1* | 1/2015 | Cherian | H04W 8/26 370/331 |
| 2015/0016416 | A1* | 1/2015 | Hawkes | H04W 8/26 370/331 |
| 2015/0058938 | A1* | 2/2015 | Gaspar | H04L 63/0892 726/5 |
| 2015/0341788 | A1* | 11/2015 | Naslund | H04L 63/0892 370/329 |
| 2016/0036771 | A1* | 2/2016 | Yadav | H04L 41/0803 709/223 |
| 2016/0087972 | A1* | 3/2016 | Ahmavaara | H04L 63/205 726/10 |
| 2017/0078333 | A1* | 3/2017 | Tevlin | H04L 63/0876 |
| 2017/0134954 | A1* | 5/2017 | Speight | H04W 12/0808 |
| 2017/0317970 | A1* | 11/2017 | Yadav | H04L 63/08 |
| 2017/0317981 | A1* | 11/2017 | Klein | H04L 63/061 |
| 2017/0318614 | A1* | 11/2017 | Wang | H04W 48/08 |
| 2018/0084414 | A1* | 3/2018 | Lee | H04W 12/04033 |
| 2018/0103363 | A1* | 4/2018 | Faccin | H04W 84/12 |
| 2018/0205717 | A1* | 7/2018 | Zou | H04L 63/205 |
| 2018/0227699 | A1* | 8/2018 | Kim | H04W 8/02 |
| 2018/0227759 | A1* | 8/2018 | Liu | H04W 12/06 |
| 2018/0227968 | A1* | 8/2018 | Wang | H04L 12/06 |
| 2018/0332457 | A1* | 11/2018 | Thiebaut | H04L 63/0892 |
| 2019/0007830 | A1* | 1/2019 | Ben Henda | H04W 12/06 |
| 2019/0058993 | A1* | 2/2019 | Yu | H04W 84/045 |
| 2019/0215691 | A1* | 7/2019 | Salkintzis | H04W 12/1006 |
| 2019/0222556 | A1* | 7/2019 | Yadav | H04L 63/08 |
| 2019/0239261 | A1* | 8/2019 | Wang | H04W 76/11 |
| 2019/0261178 | A1* | 8/2019 | Rajadurai | H04L 63/0892 |
| 2019/0335316 | A1* | 10/2019 | Kim | H04W 60/00 |
| 2019/0335323 | A1* | 10/2019 | Ringland | H04L 63/083 |
| 2019/0335330 | A1* | 10/2019 | Salkintzis | H04W 12/00514 |
| 2019/0335373 | A1* | 10/2019 | Kang | H04W 8/06 |
| 2020/0008055 | A1* | 1/2020 | Jost | H04W 12/0609 |
| 2020/0029212 | A1* | 1/2020 | Lee | H04W 12/04033 |
| 2020/0045541 | A1* | 2/2020 | Kreishan | H04W 12/06 |
| 2020/0059783 | A1* | 2/2020 | Wifvesson | H04W 12/04 |
| 2020/0127972 | A1* | 4/2020 | Aldossary | H04L 63/0209 |
| 2020/0178324 | A1* | 6/2020 | Wang | H04W 12/06 |
| 2020/0196147 | A1* | 6/2020 | Ben Henda | H04W 12/06 |

FOREIGN PATENT DOCUMENTS

| | | | | |
|---|---|---|---|---|
| CA | 3033131 A1 * | 3/2018 | ........ | H04W 12/0609 |
| CN | 109691157 A * | 4/2019 | ...... | H04W 12/04033 |
| EP | 2572491 A1 * | 3/2013 | ...... | H04W 12/0602 |
| EP | 3516894 A1 * | 7/2019 | ...... | H04W 12/04033 |
| EP | 3533245 A1 * | 9/2019 | ........... | H04L 63/162 |
| EP | 2572491 B1 * | 3/2020 | ........ | H04L 63/0884 |
| WO | WO-2011154861 A1 * | 12/2011 | ........ | H04W 12/0602 |
| WO | WO-2018052640 A1 * | 3/2018 | ...... | H04W 12/04033 |
| WO | WO-2018077607 A1 * | 5/2018 | ............ | H04W 12/04 |
| WO | WO-2019196860 A1 * | 10/2019 | ........... | H04W 12/06 |

OTHER PUBLICATIONS

3rd Generation Partnership Project, Technical Specification Group Services and System Aspects, Study on the Wireless and Wireline Convergence for the 5G system architecture (Release 16), Dec. 2018, Technical Specification, 23.502, Version 16.0.0 (Year: 2018).*
3rd Generation Partnership Project, Technical Specification Group Services and System Aspects, Procedures for the 5G System (5GS),

(56) References Cited

OTHER PUBLICATIONS

Stage 2 (Release 16), Sep. 2019, Technical Specification 23.502, Version 16.2.0 (Year: 2019).*
Nokia et al., Update of EAP-5g based solution for 5G Registration via Untrusted Non-3GPP Access, Aug. 21, 2017, SA WG3 Meeting #122bis, Tdoc: S2-175496 (Year: 2017).*
Motorola Mobility et al., 5G Registration via Untrusted Non-3GPP Access using EAP, Aug. 21, 2017, SA WG2 Meeting #122bis, Tdoc: S2-175687 (Year: 2017).*
Motorola Mobility et al., 5G Registration via Untrusted Non-3GPP Access using EAP, Aug. 21, 2017, SA WG2 Meeting #122bis, Tdoc: S2-176269 (Year: 2017).*
Motorola Mobility et al., 5G Registration via Untrusted Non-3GPP Access using EAP, Oct. 23, 2017, SA WG2 Meeting #123, Tdoc: S2-176968 (Year: 2017).*
Motorola Mobility et al., 5G Registration via Untrusted Non-3GPP Access using EAP, Oct. 23, 2017, SA WG2 Meeting #123, Tdoc: S2-177680 (Year: 2017).*
Motorola Mobility et al., Details of EAP-5G Solution for registration via untrusted non-3GPP access, Oct. 23, 2017, SA WG2 Meeting #123, Tdoc: S2-177681 (Year: 2017).*
Motorola Mobility et al., 5G Registration via Untrusted Non-3GPP Access using EAP, Oct. 23, 2017, SA WG2 Meeting #123, Tdoc: S2-177794 (Year: 2017).*
Ericsson, PDU session establishment procedure for FN-RG, Apr. 8, 2019, SA WG2 Meeting #132, Tdoc: S2-1903124 (Year: 2019).*
Nokia et al., Update to FN-RG Registration via W-5GAN, Jun. 24, 2019, SA WG2 Meeting #134, Tdoc: S2-1907301 (Year: 2019).*
Nokia et al., Update to FN-RG Registration via W-5GAN, Jun. 24, 2019, SA WG2 Meeting #134, Tdoc: S2-1907302 (Year: 2019).*
Cablelabs et al., FN-RG configuration update, Jun. 24, 2019, 3GPP TSG-SA WG2 Meeting #134, Tdoc: S2-1907544 (Year: 2019).*
Cablelabs et al., Signalling connection between the 5G-CRG and W-AGF, Jun. 24, 2019, 3GPP TSG-SA WG2 Meeting #134, Tdoc: S2-1907549 (Year: 2019).*
Ericsson et al., Service request procedure for FN-RG, Jun. 24, 2019, 3GPP TSG-SA WG2 Meeting #134, Tdoc: S2-1907781 (Year: 2019).*
Telecom Italia et al., FN-RG Configuration Update, Jun. 24, 2019, 3GPP TSG-SA WG2 Meeting #134, Tdoc: S2-1907782 (Year: 2019).*
Nokia et al., Update to FN-RG Registration via W-5GAN, Jun. 24, 2019, 3GPP TSG-SA WG2 Meeting #134, Tdoc: S2-1907793 (Year: 2019).*
Huawei et al., Correction of EAP support in Registration procedure for 5G-RG, Feb. 24, 2020, 3GPP TSG-WG SA2 Meeting #137E e-meeting, Tdoc: S2-2002231 (Year: 2020).*
Huawei et al., Correction of EAP support in Registration procedure for 5G-RG, Feb. 24, 2020, 3GPP TSG-WG SA2 Meeting #137E e-meeting, Tdoc: S2-2002235 (Year: 2020).*
Huawei et al., Correction on wireline access, Apr. 20, 2020, 3GPP TSG-WG SA2 Meeting #138E e-meeting, Tdoc: S2-2003440 (Year: 2020).*
Ericsson et al., Handling of IPv6 addresses for FN-RG, Aug. 19, 2020, 3GPP TSG SA WG2 Meeting #140E, Tdoc: S2-2004926 (Year: 2020).*
3rd Generation Partnership Project; Technical Specification Group Services and System Aspects; System Architecture for the 5G System (5GS); Stage 2 (Release 16), 3GPP TS 23.501 V16.2.0, pp. 1-391, Sep. 2019.
3rd Generation Partnership Project; Technical Specification Group Services and System Aspects; Wireless and wireline convergence access support for the 5G System (5GS) (Release 16), 3GPP TS 23.316 V16.1.0, pp. 1-75, Sep. 2019.

\* cited by examiner

METHODS AND APPARATUS FOR SUPPORTING DEVICES OF DIFFERENT TYPES USING A RESIDENTIAL GATEWAY

FIELD

The present application relates to communications methods and apparatus and, more particularly, to methods and apparatus for providing services to a device or devices at a visited customer premise based, in some cases, on a service level or service subscription associated with a visiting device.

BACKGROUND

The 5G System architecture is designed to support a wide variety of connectivity networks including both wireline and wireless access networks. One of the objectives for the "Wireless and Wireline Convergence for the 5G system architecture" study in 3GPP is to support connectivity to 5GC using wireline broadband access using hybrid-fibre coaxial (HFC) access network technologies specified by CableLabs. As referenced in 3GPP TS 23.501 V16.2.0 (2019-09) a high-level architecture is defined.

Drawing 100 of FIG. 1 illustrates non-roaming architecture for 5G Core Network for 5G Residential Gateway (5G-RG) with Wireline 5G Access network and Next Generation Radio Access Network (NG RAN). Drawing 100 includes a 5G-RG 102, a 3rd Generation Partnership Project Access Network (3GPP Access) 104, a Wireline 5G Access Network (W-5GAN) 106 including a Wireline Access Gateway Function (W-AGF) 108, an Access and Mobility Management Function (AMF) 110 a Session Management Function (SMF) 112 a User Plane Function (UPF) 114 and a data network 116 coupled together. The 5G-RG 102 is coupled to the 3GPP Access 104 via connection 118. The 5G-RG 102 is coupled to W-AGF 108 via Y4 connection 120. The AMF 110 is coupled to the W-AGF 108 via N2 connection 122. The 3GPP access 104 is coupled to the AMF 110 via N2 connection 124. The 3GPP Access 104 is coupled to the UPF via N3 connection 126. The W-AGF 108 is coupled to the AMF 110 via N11 connection 130. The SMF 112 is coupled to the UPF 114 via N4 connection 132. The UPF 114 is coupled to the data network 116 via N6 connection 134. The 5G-RG 120 is coupled, via the 3GPP access 104 to the AMF 110 via N1 connection 136. The 5G-RG 102 is coupled, via the W-AGF 108, to the AMF 110 via N1 connection 138.

Drawing 200 of FIG. 2 illustrates non-roaming architecture for 5G Core Network for Fixed Network Residential Gateway (FN-RG) with Wireline 5G Access network. Drawing 200 includes a FN-RG 202, a W-5GAN 204 including a W-AGF 206, an AMF 208, a SMF 210, a UPF 212 and a data network 214 coupled together. The FN-RG 202 is coupled to the W-AGF 206 via Y5 connection 216. The W-AGF is coupled to the AMF via N1 connection 218 and via N2 connection 220. The AMF is coupled to the SMF 210 via N11 connection 224. The W-AGF 206 is coupled to the UPF 212 via N3 connection 222. The SMF 210 is coupled to the UPF 212 via N4 connection 226. The UPF 212 is coupled to he data network 214 via N6 connection 228.

In FIG. 1 and FIG. 2, Y4 120 and Y5 216 reference points, respectively, correspond to hybrid-fibre coaxial (HFC) using Data Over Cable Service Interface Specification (DOCSIS) MAC and Upper Layer Protocols Interface MULPI.

A Local Area Network (LAN), e.g., a WiFi network, may be coupled to the FN-RG shown in FIG. 2. A first user may subscribe to a particular level of service and that level of service may be provided to customer premises corresponding to the first subscriber (first user). Thus a first subscriber's device can receive the subscribed level of service which operating through a LAN at his home customer premise site.

However, the first subscriber's user device may be a mobile device, and the first subscriber may, at times, be located at another customer premise, e.g., a friend's home. The friend (second subscriber) may subscribe to a different level of service, e.g., a lower level of service. Thus, when at the friend's home the first subscriber may receive a lower level of service while operating through his friend's LAN, than when he is located at his home and is operating through his own LAN.

Unfortunately when away from home and visiting another customer premise, a subscriber to a service is often limited to receiving service consistent the level of service, e.g., bandwidth, provided to the customer premise in accordance the service agreement associated with the visited customer premise and, in fact, the visitor may have to share the limited bandwidth to which the owner of the visited customer premise subscribes with the owner's devices at the visited customer premise.

It would be desirable if a subscribers level of service followed the user, e.g., ported with the user, such that the user received his subscribed level of service irrespective as to whether the user was at his home customer premises or at another customer premises. Based on the above there is a need for new method and/or apparatus for providing services to user devices.

SUMMARY

Figure 1:
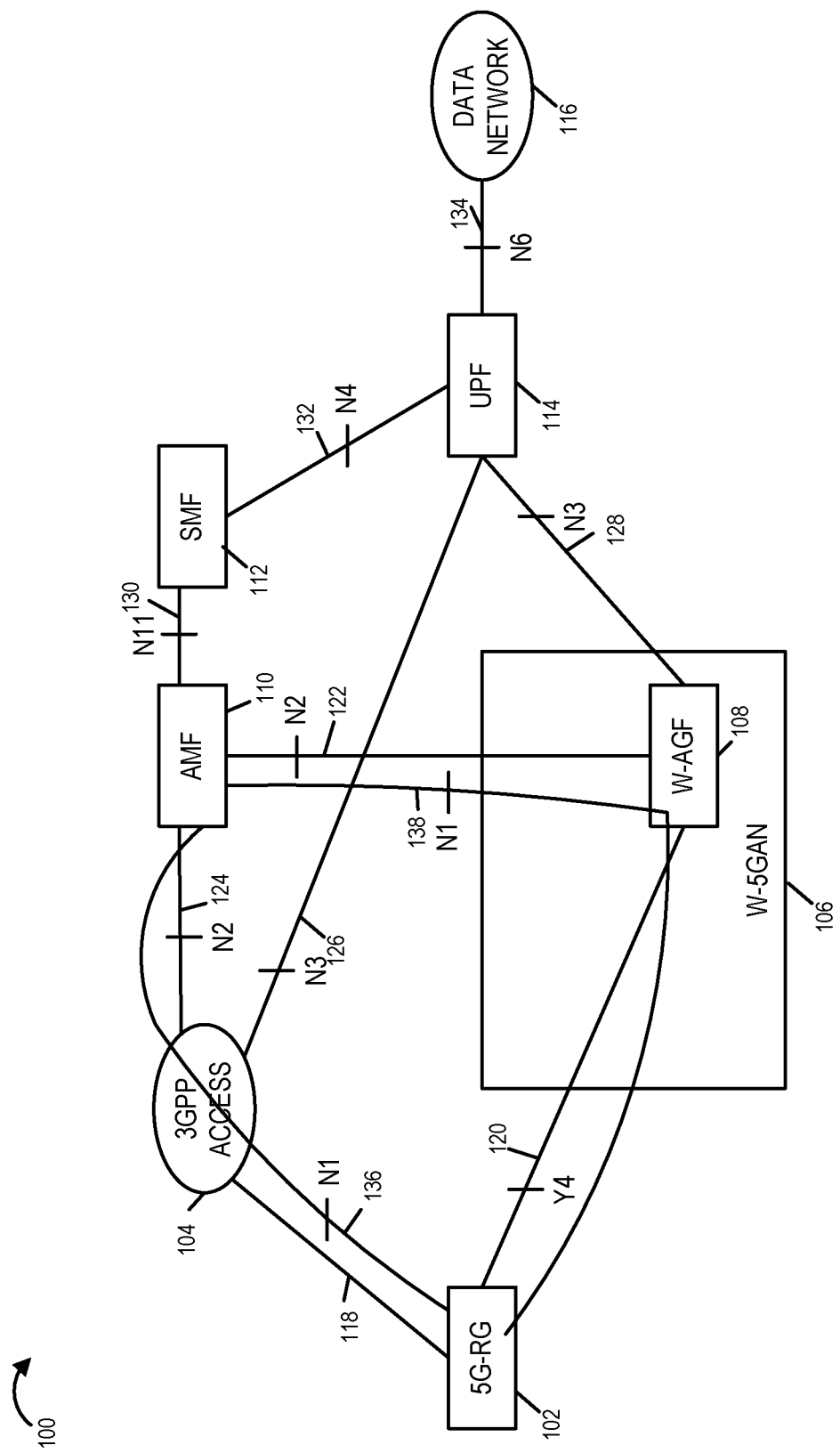
FIG. 1 illustrates non-roaming architecture for 5G Core Network for 5G-RG with Wireline 5G Access network and NG RAN.
Figure 2:
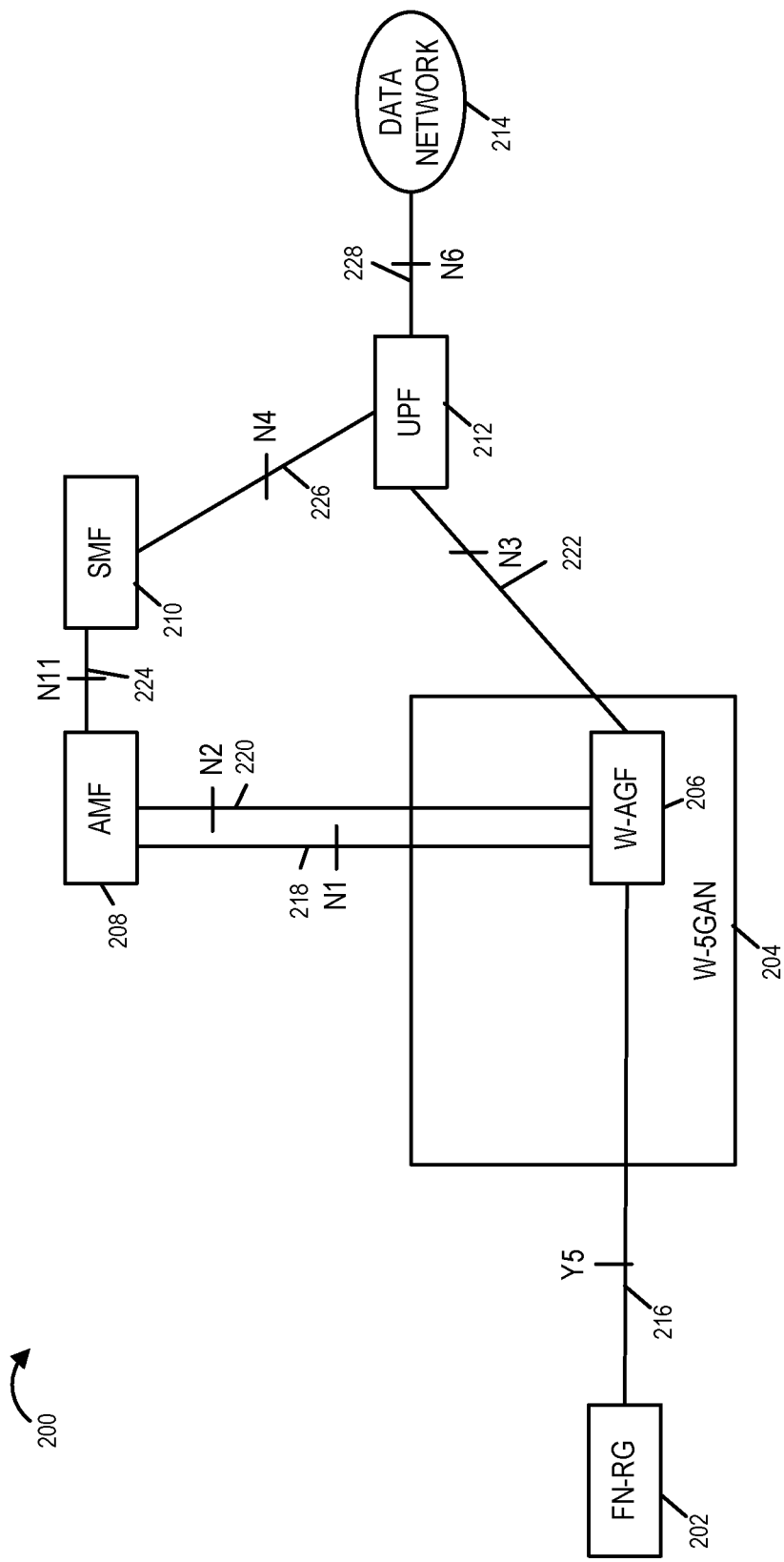
FIG. 2 illustrates non-roaming architecture for 5G Core Network for FN-RG with Wireline 5G Access network.

Cable Internet subscription (i.e. Max speed/bandwidth), which is typically tied to a household cable modem, is associated with a user and the user's device(s). Various features and/or aspects, in accordance with the present invention, allow a user to take his subscription (i.e., speed bandwidth) to other households when accessing the internet from his devices. This approach creates a portable Quality of Experience (QoE) for a user. A user device, which may be authenticated, receives the same subscription service level regardless as to whether the user device is located at its home customer premise or is located at a visiting customer premise. Different user devices, corresponding to different subscribers with different levels of service, which are currently located at the same customer premise, are each provided with the level of service to which the particular user subscribes. Separate bit pipes between a FN-RG and a UPF, are established for and used by the different subscribers, each bitpipe including a DOCSIS resource and a user plane tunnel. The separate tunnels, e.g. separate N3 tunnels, between a W-AGF and a UPF, are established for and used by the different subscribers.

In some embodiments, different types of devices (type A devices which perform 802.1x authentications, e.g., EAP-TLS certificate based authentication or EAP-TTLS username/Password authentication, and type B devices which do not perform 802.1x authentications but may perform local air interface encryption, e.g., using WPA/2 with a shared-password) which are currently located at the same customer premise are allocated resources differently. User devices located at the customer premise, which are subject to 802.1x authentication, are sometimes referred to as type A devices, and each type A device, corresponding to a different user, is allocated its own bit pipe and its own tunnel (N3 tunnel), which supports the level of service to which the user subscribes. User devices located at the customer premise, which are not subject to 802.1x authentication, are sometimes referred to as type B devices, and each of the type B user devices at the same customer premise share a common bit pipe including a single tunnel (single N3 tunnel), which is shared by the set of type B user devices.

In various embodiments Type A and Type B devices at a customer premise obtain connectivity to and/or services from devices outside the customer premise via a residential gateway. The residential gateway is connected by a communications link, e.g., a cable modem link or another type of DOCSIS communications link to an element of the 5G network, e.g., a wireline gateway. The devices a customer premise may connect via an Ethernet connection to the residential gateway or via a WiFi access point at the customer premise which has an Ethernet connection to the residential gateway.

An exemplary communications method, in accordance with some embodiments, comprises: reserving a first set of (DOCSIS) resources for communication between a residential gateway and wireline access gateway; using the first set of reserved resources to communicate a first DHCP request and first DHCP response for a first user device of a second type; using the first set of reserved resources to communicate EAP authentication messages for a first user device of a first type; reserving, following successful EAP authentication of the first device of the first type a second set of (DOCSIS) resources for communication of messages corresponding to the first device of the first type between the residential gateway and the wireline access gateway; and using the second set of reserved resources to communicate a second DHCP request and second DHCP response for the first user device of the first type.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 3:
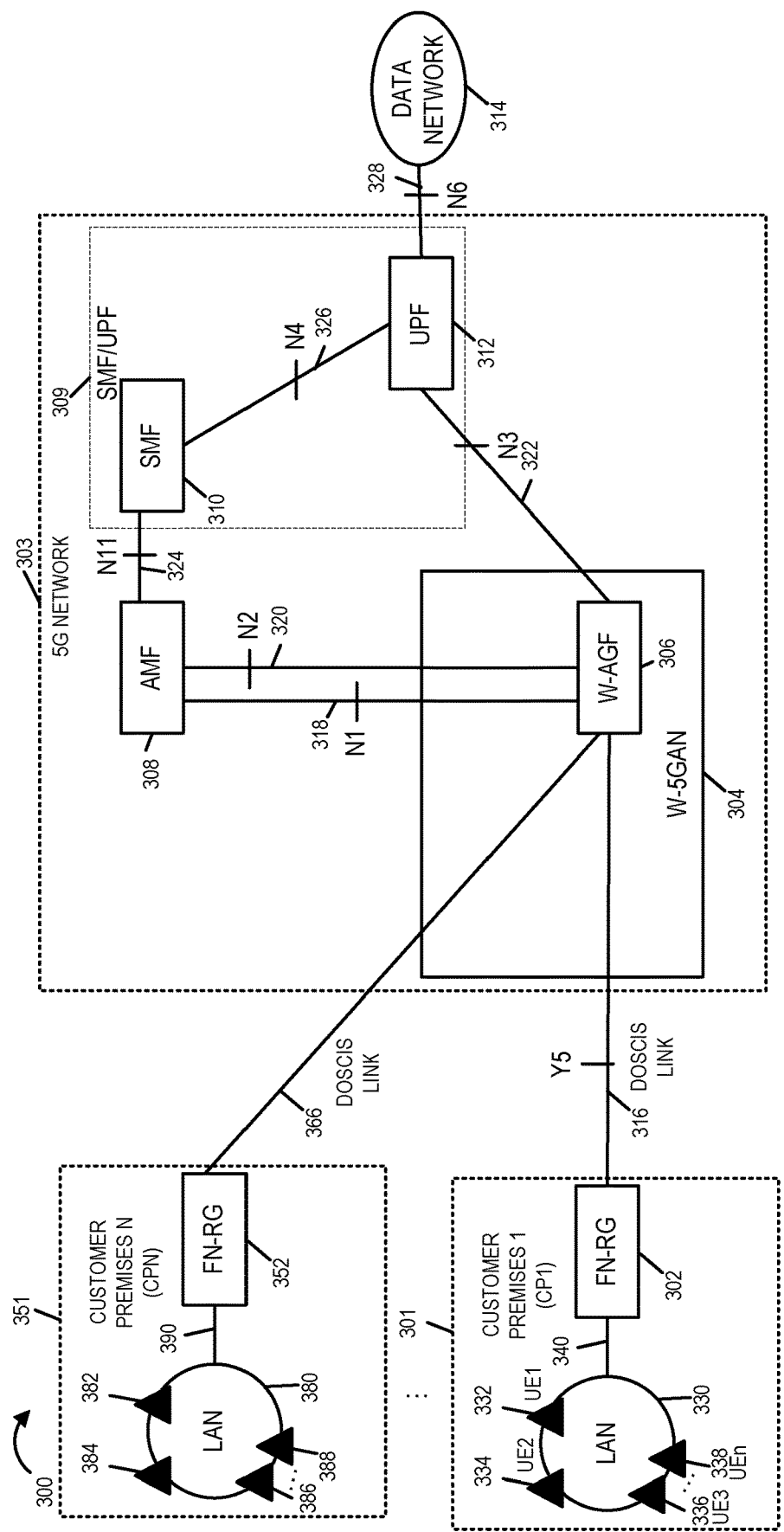
FIG. 3 illustrates an exemplary 5GC, which can be, and sometimes is, configured to serve devices without 3GPP credentials and 3GPP protocols (NAS) support and devices with 3GPP credentials and 3GPP protocols (NAS) support, in accordance with various exemplary embodiments.

FIG. 3 illustrates an exemplary communications system 300 including a 5G network 303, a plurality of customer premises (customer premises 1 (CP1) 301, . . . , customer premises N (CP N) 351, and a data network 314 coupled together.

Customer premises 1 (CP1 301) includes FN-RG 302, e.g., a cable modem, and local area network (LAN) 330 including a plurality of user devices, e.g., user equipment (UE) devices, (user device 332, user device 334, user device 336, . . . , user device 338) coupled together. The user devices (user device 332, user device 334, user device 336, . . . , user device 338) of LAN 330 are coupled to the FNRG 302 via links 340, e.g., Ethernet(s) interface connections or WiFi wireless connections. Customer premises N (CPN 351) includes FN-RG 352, e.g., a cable modem, and local area network (LAN) 380 including a plurality of user devices, e.g., user equipment (UE) devices, (user device 382, user device 384, user device 386, . . . , user device 388) coupled together. The user devices (user device 382, user device 384, user device 386, . . . , user device 388) of LAN 380 are coupled to the FN-RG 352 via links 390, e.g., Ethernet(s) interface connections or WiFi wireless connections.

The 5G network 303 includes a W-5GAN 304 including a W-AGF 306, an AMF 308, a SMF 310, and a UPF 312, coupled together. In some embodiments, the SMF 310 and UPF 312 are part of a SMF/UPF device 309. The FN-RG 302 of CP1 301 is coupled to the W-AGF 306 via Y5 connection 316, e.g., a DOCSIS link. The FN-RG 352 of CPN 351 is coupled to the W-AGF 306 via Y5 connection 366, e.g., a DOCSIS link. The W-AGF 306 is coupled to the AMF 308 via N1 connection 318 and via N2 connection 320. The AMF 308 is coupled to the SMF 310 via N11 connection 324. The W-AGF 306 is coupled to the UPF 312 via N3 connection 322. The SMF 310 is coupled to the UPF 312 via N4 connection 326. The UPF 312 is coupled to the data network 314 via N6 connection 328.

Within a group of devices, e.g., the group of user devices (332, 334, 336, . . . , 338), behind a FN-RG, e.g., FN-RG 302, one can further separate the devices into two types of devices: Type-A devices and Type-B devices. Each of the devices in the group of user devices (332, 334, 336, . . . , 338) may be a Type-A device or a Type-B device.

Type-A devices are devices which can perform 802.1x authentications such as, e.g., EAP-TLS certificate based authentication or EAP-TTLS user-name/Password authentication. Exemplary Type-A devices include, e.g., a typical laptop computer or handheld iPad like devices.

Type-B devices are devices which can perform local air interface encryption, e.g., using WPA/2 with a shared-password but cannot perform 802.1x authentications.

When these two types of devices are being served behind the same FN-RG, in accordance with a feature of some embodiments, of the present invention, the different types of devices are handled differently by the 5G network 303 implemented in accordance with the present invention.

The 5G Core (5GC), including the W-AGF 306 and UPF 312, of the 5G network 303 is configured to serve devices without 3GPP credentials and 3GPP protocols (NAS) support and devices with 3GPP credentials and 3GPP protocols (NAS), in accordance with various exemplary embodiments. In system 300 of FIG. 3, the 5GC of 5G network 303 serves user devices (user device 332, user device 334, user device 336, user device 338) behind Fixed Network-Residential Gateway (FN-RG) 302, e.g., a cable modem at CP1 301. In system 300 of FIG. 3, the 5GC of 5G network 303 also serves user devices (user device 382, user device 384, user device 386, user device 388) behind Fixed Network-Residential Gateway (FN-RG) 352, e.g., a cable modem at CPN 351.

Figure 4:
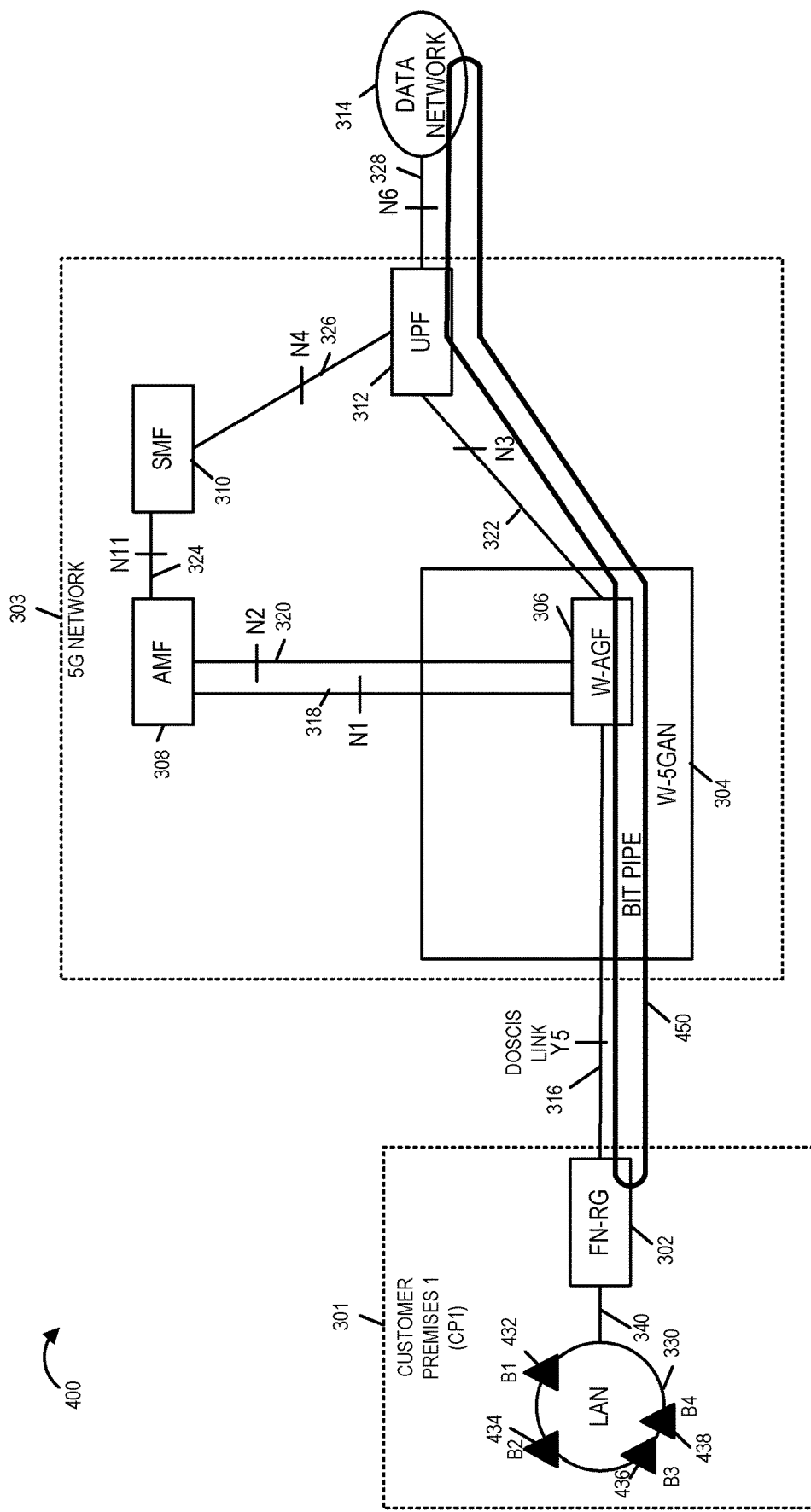
FIG. 4 illustrates multiple type B devices using the same bit-pipe from FN-RG toward the data network in accordance with an exemplary embodiment.

System 400 of FIG. 4 is the same as system 300 of FIG. 3, except user devices (332, 334, 336, 338) of FIG. 3 have been replaced with user devices (Type B user device 1 432, Type B user device 2 434, Type B user device 3 436, Type B user device 4 438). In FIG. 4 CPE N 351 is not shown.

Under some scenarios, every device behind a FN-RG can share the same bit-pipe between the FN-RG and UPF as shown in drawing 400 of FIG. 4. FIG. 4 illustrates devices using the same bit-pipe from FN-RG toward the data network. In this case, in some embodiments, the bandwidth being allocated to the devices is controlled locally at the local LAN/WLAN level. In the exemplary scenario of FIG. 4, each of the devices are type-B devices.

In system 400 of FIG. 4, each of the user devices (432, 434, 436, 438) of the LAN 330 are type-B devices. In the example of FIG. 4, every device (432, 434, 436, 438) behind the FN-RG 302 shares the same bit-pipe 450 between the FN-RG 302 and UPF 312 as shown in drawing 400 of FIG. 4. FIG. 4 illustrates devices (432, 434, 436, 438) using the same bit-pipe 450 from FN-RG 302 toward the data network 314. In this case the bandwidth being allocated to the devices (432, 434, 436, 438) is controlled locally at the local LAN/WLAN level, e.g., LAN 330 level.

Figure 5:
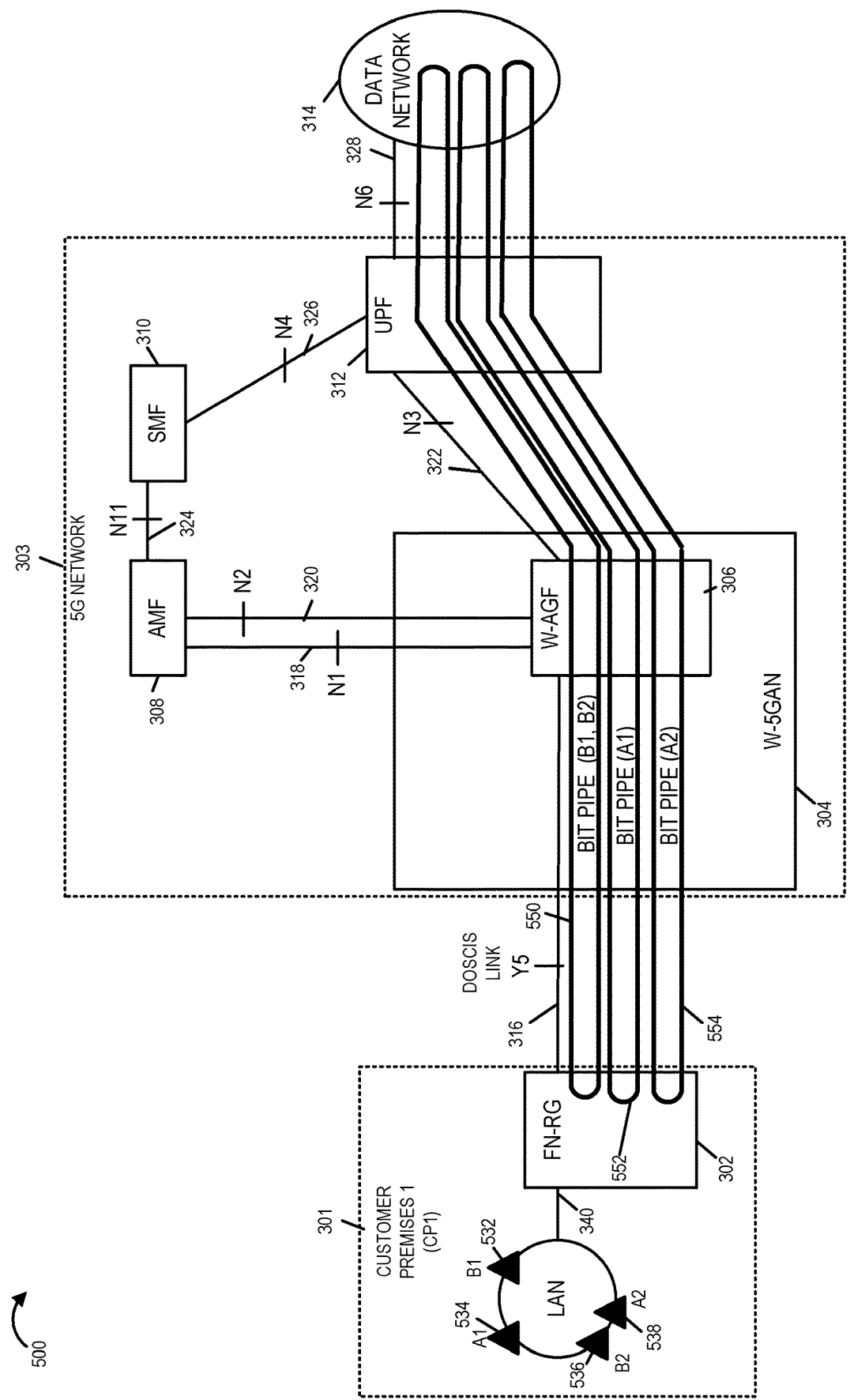
FIG. 5 illustrates multiple type-B devices using the same bit-pipe from FN-RG toward the data network and each of a plurality of type-A devices using its own bit-pipe from FN-RG toward the data network in accordance with an exemplary embodiment.

System 500 of FIG. 5 is the same as system 300 of FIG. 3, except user devices (332, 334, 336, 338) of FIG. 3 have been replaced with user devices (Type B user device 1 532, Type A user device 1 534, Type B user device 2 536, Type A user device 2 538). In FIG. 5 CPE N 351 is not shown.

In the example of FIG. 5, each of the Type B devices (Type B device 1 532, Type B device 2 536) behind the FN-RG 302 share the same bit-pipe 550 between the FN-RG 302 and UPF 312. In the example of FIG. 5, each of the Type A user devices (Type A device 1 534, Type A device 2 538) behind the FN-RG 302) are assigned its own bit-pipe (550, 554), respectively, between the FN-RG 302 and UPF 312. In this case the bandwidth being allocated to the Type B devices (532, 536) is controlled locally at the local LAN/WLAN level, e.g., LAN 330 level; however, the bandwidth being allocated to the Type A devices (534, 538) is controlled via the 5GC.

Figure 6:
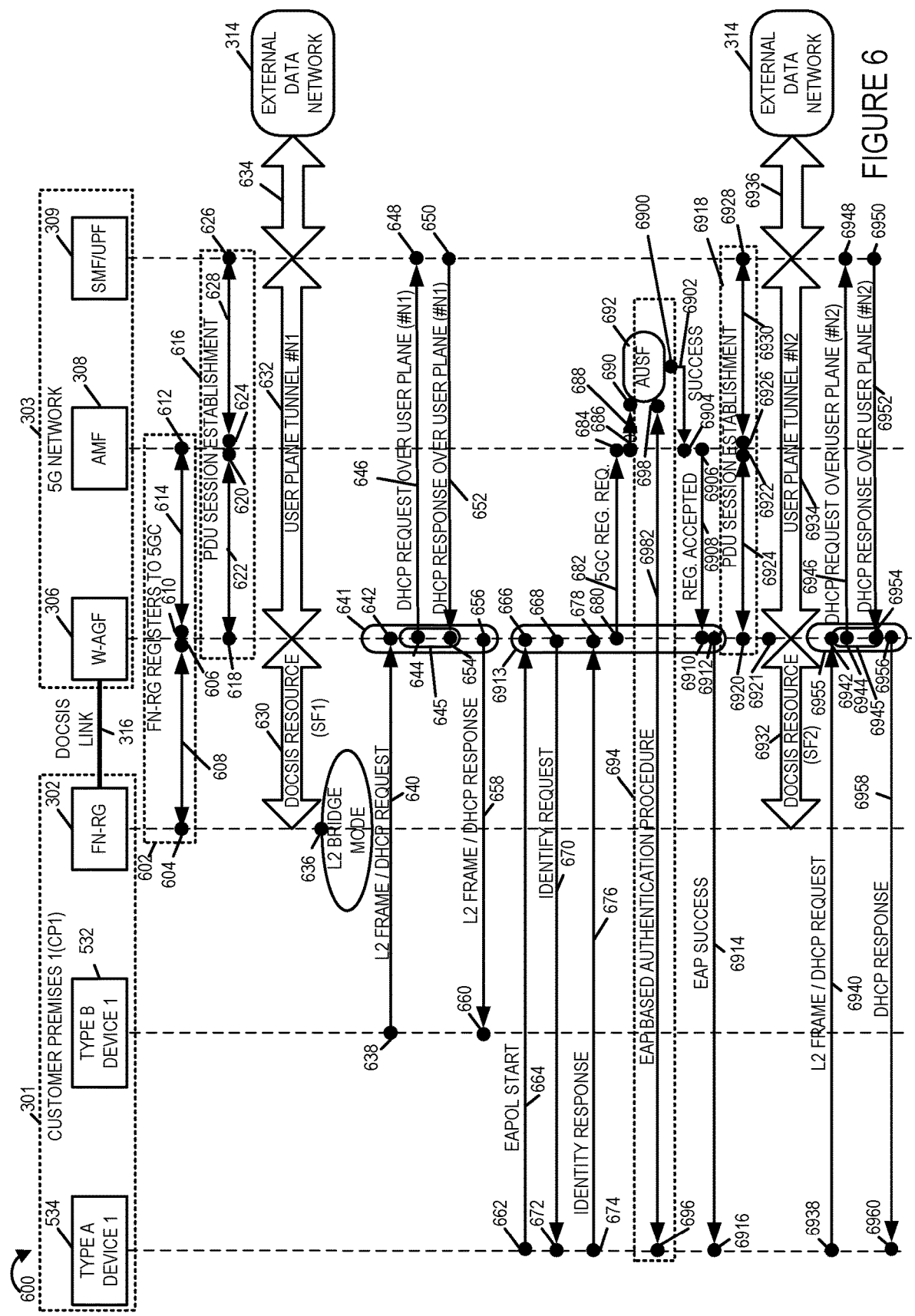
FIG. 6 illustrates exemplary overall call flow for Type-A devices and Type-B devices behind the same FN-RG.

Drawing 600 of FIG. 6 illustrates exemplary overall call flow for Type-A devices and Type-B devices behind the same FN-RG. Drawing 600 includes Type-A device 534, Type-B device 1 532, FN-RG 302, W-AGF device 306, AMF device 308, and a SMF/UPF device 309.

In step 602 the FN-RG 302 registers to 5GC of the 5G network 303. This follows the procedures is defined in 3GPP TS 23.316 V16.1.0 (2019-09) which is hereby expressly incorporated by reference in its entirety, see e.g., section 7.2.1.3. Step 602 includes steps 604, 606, 610 and 612. In step 604 the FN-RG 302 sends and receives registration signals 608 to/from the W-AGF 306. In step 606 the W-AGF 306 receives and sends registration signals 608 from/to the FN-RG 302. In step 610 the W-AGF 306 sends and receives registration signals 614 to/from the AMF 308. In step 612 the AMF 308 receives and sends registration signals 614 from/to the W-AGF 306.

In step 616 Protocol Data Unit (PDU) session establishment operations are performed. Step 616 includes steps 618, 620, 624 and 626. In step 618 the W-AGF sends and receives session establishment signals 622 to/from the AMF 308. In step 620 the AMF 308 receives and sends session establishment signals 622 from/to the W-AGF 306. In step 624 the AMF 308 sends and receives session establishment signals 628 to/from the SMF/UPF 309. In step 626 the SMF/UPF 309 receives and sends session establishment signals 628 from/to the AMF 308. In step 616 the W-AGF 306 initiates a PDU session establishment request (one of signals 622) to establish the user-plane tunnel between W-AGF 306 and UPF of SMF/UPF 309. This follows the procedure defined in TS 23.316, section 7.3.4. The user plane tunnel 632, designated as user plane tunnel #N1, is established between W-AGF 306 and UPF of SMF/UPF 309 for that FN-RG 302. W-AGF 302 reserves the DOCSIS resources 630 by creating (or mapping) a service flow, e.g., service flow SF1, based on the QoS information received from the N2.

In step 636, The FN-RG 302 is configured as L2 bridge mode. Hence, each of the Ethernet traffic signals are forwarded by the FN-RG 302 to the W-AGF 306.

Each Type-B device, e.g., type B device 1 532, will ask for the IP address assignment from the Dynamic Host Configuration Protocol (DHCP) request, SMF assigned the IP address (e.g., V4 IP address) via DHCP response. The DHCP request/response is sent via the user-plane. Each Type-B device e.g., type B device 1 532, will perform operations to retrieve an IP address assignment. W-AGF 306 maintains a table of Type-B devices' assigned IP addresses and the N3 tunnel information (e.g., source/destination IP at the GTP level). This means that each of the Type-B devices will share the same bandwidth in the user plane tunnel.

In step 638, type B device 1 532 generates and sends Layer 2 (L2) frame/DHCP request 640, requesting an IP assignment, to W-AGF 306. Step 641 includes steps 642 and 656 and involves using the set of reserved DOCSIS resources reserved for SF1 to communicate a DHCP request (640) and DHCP response (658) for a first user device (532) of a second type (Type B device 1. The DHCP request 640 is received by the W-AGF 306 in step 642. In step 644 the W-AGF 306 generates and sends DHCP request 646 over user plane tunnel #N1 632 to SMF/UPF 309. In step 648 the SMF/UPF 309 receives the DHCP request 646 and recovers the communicated information, and processes the request, said processing including operating the SMF to assign an IP address. In step 650 the SMF/UPF 309 generates and sends a DHCP response 652 over user plane tunnel #N1 632 to the W-AGF 306, which is received in step 654. Thus in step 645 which includes steps 644 and step 654 the first user plane tunnel is used to communicate the first DHCP request message (646) to the user plan function device (309) and to communicate a DHCP response message (652) providing an IP address allocated to the first device 532 of the second type to the wireline access gateway device (306).

In step 656 the W-AGF 306 generates and sends L2 frame/DHCP response 658 to type B device 1 532. In step 660 type B device 1 532 receives the L2 frame/DHCP response 658 and recovers the communicated information including the SMF assigned IP address.

Type-A devices, e.g., Type-A device 1 534, will first try to perform 802.1x authentication by sending a Extensible Authentication Protocol over LAN (EAPOL)-start frame. W-AGF 306 performs the role as Authenticator and triggers the EAP based authentication between the UE, e.g., UE 534, and Authentication Server Function (AUSF) 692 with registration request message. This registration request message include a new indication that non AKA type authentication is requested. The AUSF 692, based on this new indication, performs an EAP based authentication using, e.g. EAP-TLS or EAP-TTLS, etc.

In step 662, type-A device 1 534 generates and sends EAPOL start message 664 to W-AGF 306. In step 6913 the first set of reserved DOCSIS resources 630 is used to communicate EAP authentication messages (664 through 6914) for a first user device 534 of a first type (Type A device 1).

In step 666 the W-AGF receives EAPOL start message 664 and recovers the communicated information. In step 668 the W-AGF 306 generates and sends an identify request message 670 to type-A device 1 534, which is received by device 534 in step 672. In step 674, type-A device 1 534 generates and sends an identify response message 676 to the W-AGF 306. In step 678 the W-AGF 306 receives the identify response 676 and recovers the communicated information. In step 678 the W-AGF 306 determines, based on the received information in identify response 676, that the response was acceptable, generates a 5GC registration request message 682 and sends the 5GC registration request 682 to the AMF 308. This registration request message 682 include a new indication that non Authentication and Key Agreement (AKA) type authentication is requested. The AMF 308 receives the registration request message 682, and in response, in step 686 generates and sends registration request message 688, which is a forwarded copy of message 682, to AUSF 692.

In step 694 an EAP based authentication procedure is performed under the direction of the AUSF 692. Step 694 includes steps 696 and 698. In step 696 type-A device 1 534 receives and sends EAP based authentication procedure signals 6982 to AUSF 692. In step 698 AUSF 692 sends and receives EAP based authentication procedure signals 6982 to type-A device 1 532. In step 6900 AUSF 692 determines that the authentication is successful, generates success message 6902, and sends the success message 6902 to AMF 308. In step 6904 the AMF 308 receives the success message 6904. In step 6906 the AMF 308, in response to the received success message 6904, generates and sends a registration accepted message 6908 to the W-AGF 306. In step 6910, the W-AGF receives the registration accepted message 6908. In step 6912, the W-AGF 306, in response to the received registration accepted message 6908, generates and sends an EAP success message 6914 to type A device 1 534. In step 6916 the type-A device 1 534 receives the EAP success message 6914.

When authentication is successful, W-AGF 306 initiates a PDU session on behalf of this UE, which is type A device 1 534, similar to the PDU session establishment of step 616. Thus in step 6918, PDU session establishment operations are performed. Step 6918 includes steps 6920, step 6922, step 6926 and step 6928. In step 6920 the W-AGF 306 sends and receives PDU session establishment signals 6924. The PDU session establishment signals 6924 include a signal sent by the W-AGF to initiate a PDU session on behalf of type A device 1 534. In step 6922 the AMF 308 receives and sends PDU session establishment signals 6924. In step 6926 the AMF 308 sends and receives session establishment signals 6930. In step 6928 the SMF/UPF 309 receives and sends session establishment signals 6930.

Thus, in step 6918 the W-AGF 306 initiates a PDU session establishment request (one of signals 6924) to establish a user-plane tunnel between W-AGF 306 and UPF of SMF/UPF 309. This follows the procedure defined in 3GPP TS 23.316, section 7.3.4-1. The user plane tunnel 6934, designated as user plane tunnel #N2, is established between W-AGF 306 and UPF of SMF/UPF 309 for that FN-RG 302 to be used by type A device 1 534. W-AGF 302 in step 6921 reserves the DOCSIS resources 6932 by creating (or mapping) a service flow, e.g., service flow SF2, based on the QoS information received from the N2.

A UE performed DHCP request is used to obtain an IP address over the user-plane. In step 6938, type A device 1 534 generates sends L2 frame/DHCP request 6940, requesting an IP assignment, to W-AGF 306.

In step 6955 the second set of reserved resources is used to communicate a DHCP request (6940) and DHCP response (6958) for the first user device (534) of the first type (Type A device 1). Step 6955 includes step 6942. DHCP request 6940 is received by the W-AGF 306 in step 6942. In step 6944 the W-AGF 306 generates and sends DHCP request 6946 over user plane tunnel #N2 6934 to SMF/UPF 309. In step 6948 the SMF/UPF 309 receives the DHCP request 6946 and recovers the communicated information, and processes the request, said processing including operating the SMF to assign an IP address. In step 6950 the SMF/UPF 309 generates and sends a DHCP response 6952 over user plane tunnel #N2 6934 to the W-AGF 306, which is received in step 6954. In step 6956 the W-AGF generates and sends L2 frame/DHCP response 6958 to type A device 1 532. In step 6960 type A device 1 534 receives the L2 frame/DHCP response 6958 and recovers the communicated information including the SMF assigned IP address.

From the above it should be appreciated that in step (6945) the second user plane tunnel is used to communicate the second DHCP request message (6946) to the user plan function device (309) and to communicate a second DHCP response message (6952) providing an IP address allocated to the first device 534 of the first type to the wireline access gateway device (306).

The W-AGF 306 maintains a table of Type-A device's assigned IP address and N3 tunnel information (e.g., source/destination IP at the GPRS Tunneling Protocol (GTP) level.) This means each Type-A device will have its bandwidth in its dedicated user-plane tunnel. Thus Type-A device 1 534 will have its bandwidth in its dedicated user-plane tunnel #N2 6934.

Figure 7:
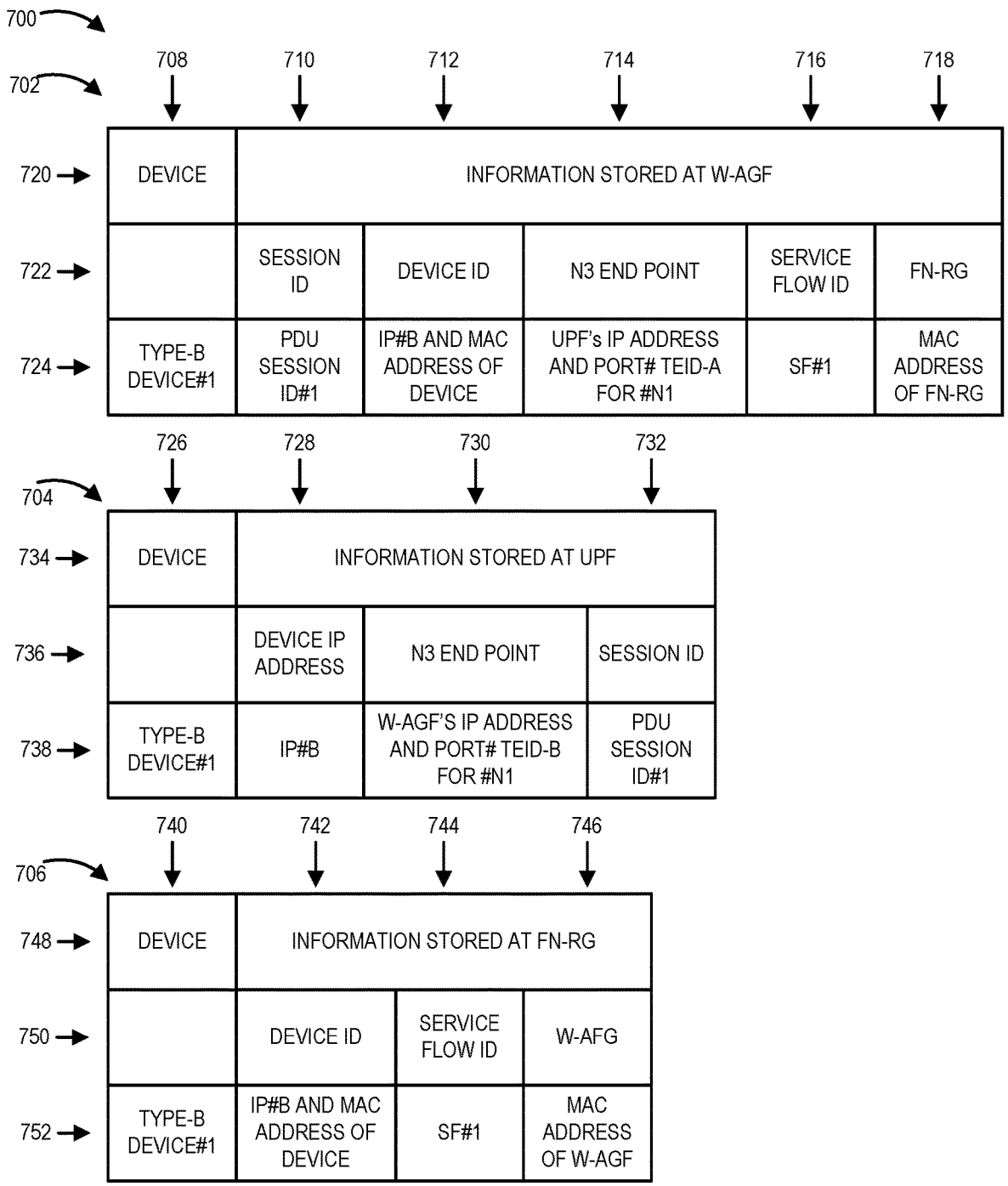
FIG. 7 is a drawing illustrating exemplary correlation tables including information for a first exemplary type-B device, which are created as part of the operations of the flow of FIG. 6.

FIG. 7 is a drawing 700 illustrating exemplary correlation tables 702, 704, 706 including information for type-B device 1 532, which are created as part of the operations of the flow of FIG. 6.

Correlation table 702 represents information stored at W-AGF device 306. Column 708 is the device column, which identifies the particular device to which a set of information stored at the W-AGF corresponds (a set of information on one row of the table 702 corresponds). Column 710 includes session ID information. Column 712 includes device ID information. Column 714 includes N3 endpoint information. Column 716 includes service flow ID information. Column 718 includes FN-RG information. Row 720 identifies column 708 as a device column and columns (710, 712, 714, 716, 718) as columns used to store sets of information, corresponding to devices, in the W-AGF. Row 722 includes labels for each of the information columns (710, 712, 714, 716, 718). Row 724 indicates that for type-B device 1 532: the session ID=PDU Session ID #1, the device ID=IP #B and the MAC address of type-B device #1, N3 end point=UPF's IP address and port #TEID-A for #N1, the service flow ID=SF #1, and FN-RG identification information=MAC address of FN-RG 302.

Correlation table 704 represents information stored at the UPF of SMF/UPF device 309. Column 726 is the device column, which identifies the particular device to which a set of information stored at the UPF corresponds (a set of information on one row of the table 704 corresponds). Column 728 includes device IP address information. Column 730 includes N3 endpoint information. Column 732 includes session ID information. Row 734 identifies column 726 as a device column and columns (728, 730, 732) as columns used to store sets of information, corresponding to devices, in the UPF. Row 736 includes labels for each of the information columns (728, 730, 732). Row 738 indicates that for type-B device 1 532: the device IP address=IP #B, N3 end point=W-AGF's IP address and port #TEID-B for #N1, the session ID=PDU session ID #1.

Correlation table 706 represents information stored at FN-RG device 302. Column 740 is the device column, which identifies the particular device to which a set of information stored at the FN-RG corresponds (a set of information on one row of the table 706 corresponds). Column 742 includes device IP information. Column 744 includes service flow ID information. Column 746 includes W-AGF information. Row 748 identifies column 708 as a device column and columns (742, 744, 746) as columns used to store sets of information, corresponding to devices, in the FN-RG. Row 750 includes labels for each of the information columns (742, 744, 746). Row 750 indicates that for type-B device 1 532: the device IP information=IP #B and the MAC address of type-B device #1 532, service flow=SF #1, and the W-AGF information=the MAC address of W-AGF 304.

After one or more or all of steps (638, 642, 646, 648, 650, 652, 656, 660), correlation tables (702, 704, 706) including entries for the Type B device 1 532 are in the W-AGF 306, SMF/UPF 309, and FN-RG 706 respectively, e.g., based on table(s) creation or table(s) update, e.g., with the completed tables (702, 704, 706) being available after step 660.

The session ID is created by W-AGF 306 to identify the PDU session within the 5G system. In step 616 N3 tunnel #1 632 is created. An N3 tunnel, such as N3 tunnel #N1 632, is identified by a combination of unique Tunnel Endpoint IDentifier (TED), IP addresses and UDP port # on each side. This information is exchanged as part of the signaling procedure between W-AGF 306 and SMF/UPF 309 in steps (618, 620, 624, 626) of step 616. As part of the DHCP Request/Response operations (steps 638, 642, 644, 648, 650, 654, 656, 660) of FIG. 6, SMF/UPF 309 assigns an IP address to Type-B device #1.

After one or more or all of steps 6918, 6920, 6922, 6926, 6928, 6938, 6942, 6944, 6948, 6950, 6954, 6956 and 6960 are performed for Type-A device 1 534, the correlation tables (702, 704, 706) are updated, resulting in updated correlation tables (802, 804 and 806), respectively, e.g., based on table updates after step 6960. Stored completed tables (802, 804 and 806) are available after step 6960.

Figure 8:
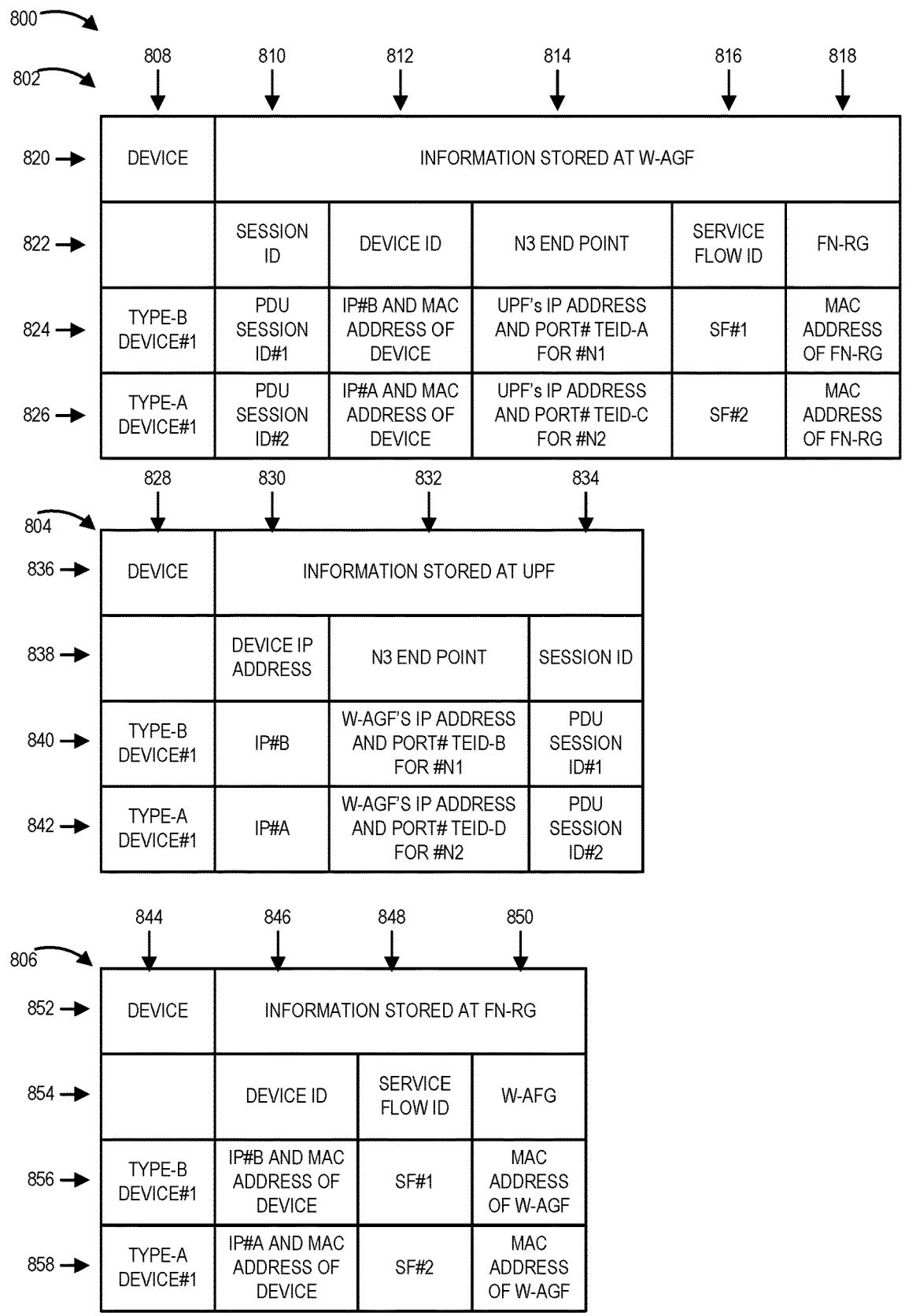
FIG. 8 is a drawing illustrating exemplary correlation tables including information for a first exemplary type-B device and information for a first exemplary type-A device, said tables being created as part of the operations of the flow of FIG. 6, and the tables of FIG. 8 being updated versions of the tables of FIG. 7.

FIG. 8 is a drawing 800 illustrating exemplary correlation tables 802, 804, 806 including information for type-B device 1 532 and information for type-A device 1 534, which are created as part of the operations of the flow of FIG. 6.

Correlation table 802 represents information stored at W-AGF 306. Column 808 is the device column, which identifies the particular device to which a set of information stored at the W-AGF corresponds (a set of information on one row of the table 802 corresponds). Column 810 includes session ID information. Column 812 includes device ID information. Column 814 includes N3 endpoint information. Column 816 includes service flow ID information. Column 818 includes FN-RG information. Row 820 identifies column 7808 as a device column and columns (810, 812, 814, 816, 818) as columns used to store sets of information, corresponding to devices, in the W-AGF. Row 822 includes labels for each of the information columns (810, 812, 814, 816, 818). Row 824 indicates that for type-B device 1 532: the session ID=PDU Session ID #1, the device ID=IP #B and the MAC address of type-B device #1, N3 end point=UPF's IP address and port #TEID-A for #N1, the service flow ID=SF #1, and FN-RG identification information=MAC address of FN-RG 302. Row 826 indicates that for type-A device 1 534: the session ID=PDU Session ID #2, the device ID=IP #A and the MAC address of type-A device #1, N3 end point=UPF's IP address and port #TEID-C for #N2, the service flow ID=SF #2, and FN-RG identification information=MAC address of FN-RG 302.

Correlation table 804 represents information stored at the UPF of SMF/UPF 309. Column 828 is the device column, which identifies the particular device to which a set of information stored at the UPF corresponds (a set of information on one row of the table 804 corresponds). Column 830 includes device IP address information. Column 832 includes N3 endpoint information. Column 834 includes session ID information. Row 836 identifies column 828 as a device column and columns (728, 730, 732) as columns used to store sets of information, corresponding to devices, in the UPF. Row 838 includes labels for each of the information columns (830, 832, 834). Row 840 indicates that for type-B device 1 532: the device IP address=IP #B, N3 end point=W-AGF's IP address and port #TEID-B for #N1, the session ID=PDU session ID #1. Row 842 indicates that for type-A device 1 534: the device IP address=IP #A, N3 end point=W-AGF's IP address and port #TEID-D for #N2, the session ID=PDU session ID #2.

Correlation table 806 represents information stored at FN-RG 302. Column 844 is the device column, which identifies the particular device to which a set of information stored at the FN-RG corresponds (a set of information on one row of the table 806 corresponds). Column 846 includes device IP information. Column 848 includes service flow ID information. Column 850 includes W-AGF information. Row 852 identifies column 844 as a device column and columns (846, 848, 850) as columns used to store sets of information, corresponding to devices, in the FN-RG. Row 854 includes labels for each of the information columns (846, 848, 850). Row 856 indicates that for type-B device 1 532: the device IP information=IP #B and the MAC address of type-B device #1 532, service flow=SF #1, and the W-AGF information=the MAC address of W-AGF 304. Row 858 indicates that for type-A device 1 534: the device IP information=IP #A and the MAC address of type-A device #1 534, service flow=SF #2, and the W-AGF information=the MAC address of W-AGF 304.

A new PDU session ID (#2) is created by W-AGF in step 6918 to identify the new PDU session within the 5G system. In step 6918 N3 tunnel #N2 6934 is created. New TED is used to identify the new N3 tunnel (#N2) 6934 and a new service flow (SF #2) is also created between the W-AGF and FN-RG for Type-A device 1 534, as indicated below allocated DOCSIS resource 6932 which corresponds to user plane tunnel #N2 6934.

Figure 9:
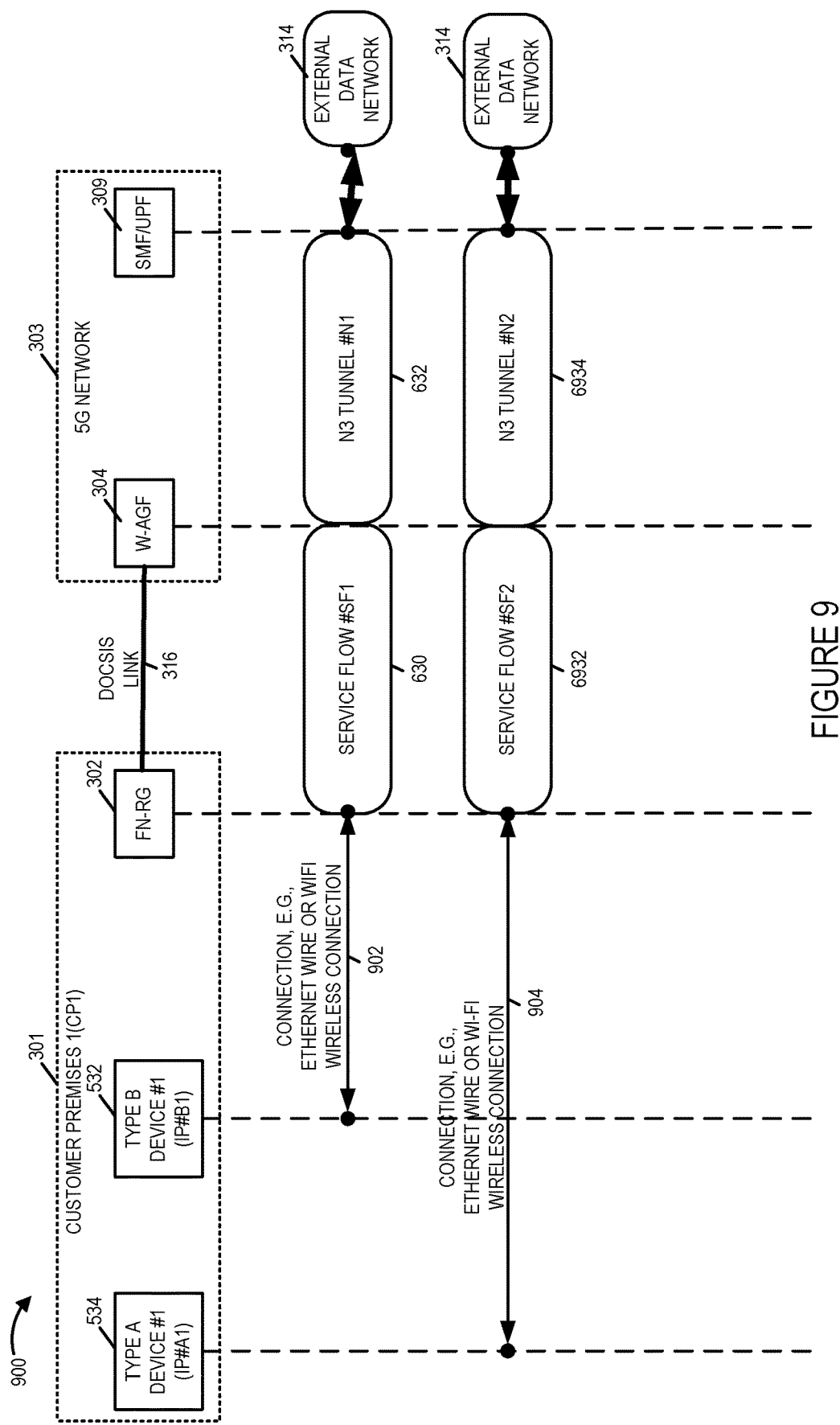
FIG. 9 shows the relationship of service flows and user plane tunnels between a W-AGF, and a UPF of a SMF/UPF device for one exemplary type-B device and one exemplary type-A device in accordance with an exemplary embodiment.

Drawing 900 of FIG. 9 shows the relationship of the user plane tunnels (632, 6934) between W-AGF 306 and UPF of SMF/UPF 309 for one type-B (Type B device 1 532) and one type A device (type A device 1 534), with regard to service flows, DOCSIS resources, and connections, e.g. Ethernet connections or WiFi wireless connections. Connection 902, e.g., an Ethernet wire or WiFi wireless connection, couples type B device 1 532 with IP address IP #B, to FN-RG 302. Service flow 1 (#SF1) is used for type B device 1 532. DOCSIS resource 630 over DOCSIS link 316, between FN-RG 302 and W-AGF 304 is used for the communicating the device 532 data. N3 tunnel #N1 632 is between W-AGF 304 and UPF of SMF/UPF 309 and is used for the device 532 data. The UPF is coupled to an external data network 314.

Connection 904, e.g., an Ethernet wire or WiFi wireless connection, couples type A device 1 534 with IP address IP #A, to FN-RG 302. Service flow 2 (#SF2) is used for type A device 1 534. DOCSIS resource 6932 over DOCSIS link 316, between FN-RG 302 and W-AGF 304 is used for the communicating the device 534 data. N3 tunnel #N2 6934 is between W-AGF 304 and UPF of SMF/UPF 309 and is used for the device 534 data. The UPF is coupled to an external data network 314.

Figure 10:
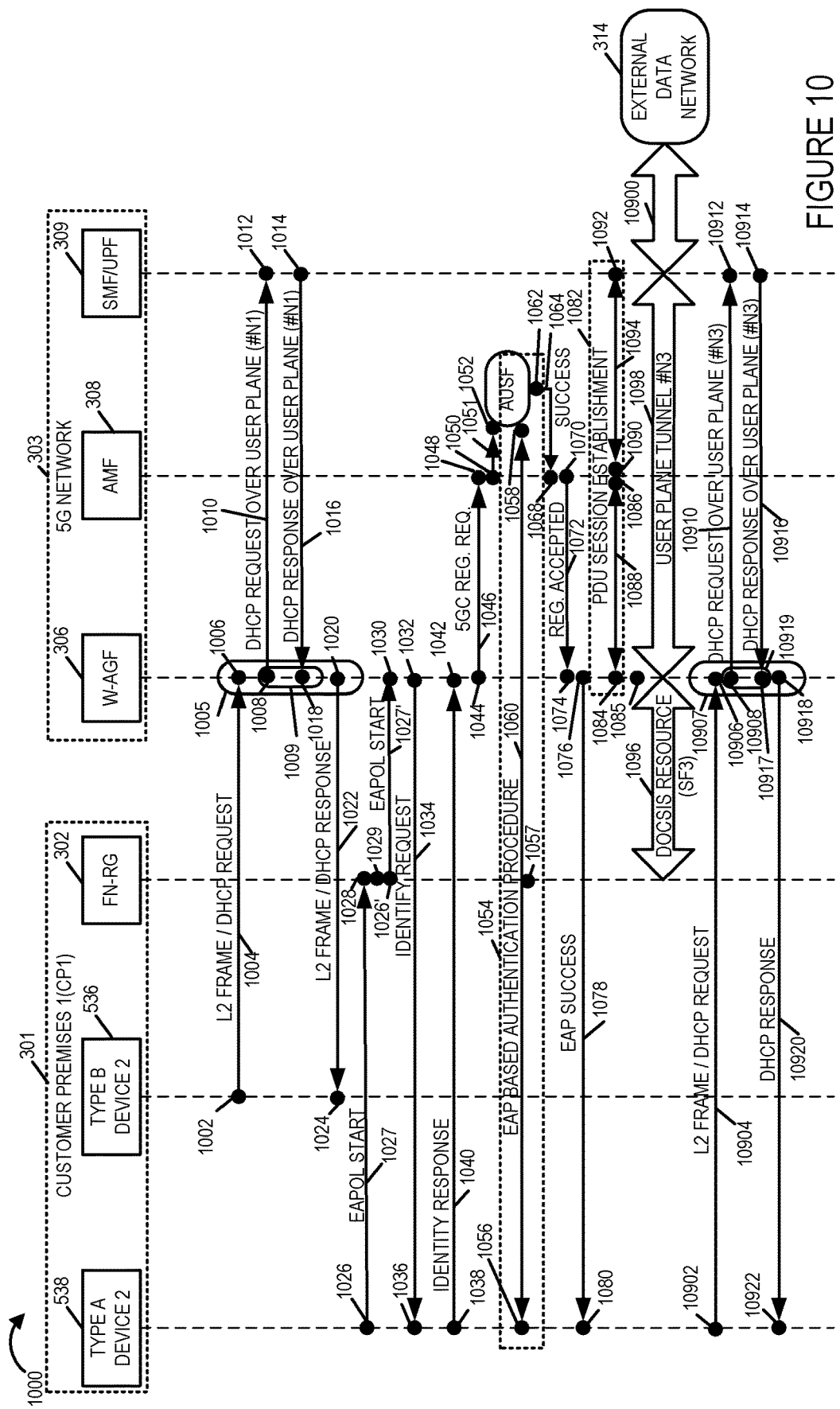
FIG. 10, which is a continuation of FIG. 6, shows a second type B device and a second type A device which are registering to the network, and exemplary additional overall call flow in accordance with an exemplary embodiment.

FIG. 10, which is a continuation of FIG. 6, shows another type B device (type B device 2 536) and another type A device (type A device 2 538) which are registering to the network.

The new Type-B device, which is type B device 2 538, will first try to get an IP address with a DHCP request. As the FN-RG 302 is not aware of any Service Flow being assigned to this new type-B device (by checking the device's MAC address), the FN-RG 302 uses the SF #1 to send the DHCP request 1004 to W-AGF 306. Thus in step 1002 type B device 2 538 generates and sends L2 frame/DHCP request 1004 to W-AGF 306, and in step 1006 the W-AGF 306 receives the DHCP request 1004. In step 1008, the W-AGF 306 forwards the DHCP request, as DHCP request 1010 using N3 tunnel #N1 632. In other words SF #1 and N3 Tunnel #1 632 are used as default. In step 1012 the SMF/UPF 309 receives the DHCP request. In step 1014 the SMF/UPF 309 generates and sends DHCP response 1016 over user plane N3 tunnel #N1 632 which is received by the W-AGF 306 in step 1018. In step 1020 the W-AGF 306 generates and sends L2 frame/DHCP response 1022, which is a forwarded version of response messages 1016, to the type B device 2 536 using the SF #1. In step 1024, the type B device 2 536 receives the L2 frame/DHCP request and recovers the communicated information, e.g., information including an assigned IP address for type B device 2 536.

For the new type-A device, which is type A device 2 538, the device 538 will first try to authenticate itself to the network by sending EAPOL-start 1028. In step 1026 type A device 2 538 generates and sends EAPOL start message 1027. In step 1028 the FN-RG 302 receives the EAPOL message 1027. In step 1029 the FN-RG 302 checks to determine if it is aware of any service flows assigned to type A device 2 538. As the FN-RG 302 is not aware of any Service flow being assigned to this new Type-A device 538 (by checking the device's MAC address in step 1029), the FN-RG 302 in step 1026' sends the EAPOL message 1027 to the W-AGF 306, as forwarded EAPOL message 1027'. In step 1030 the W-AGF 306 receives the EAPOL message 1027'.

In step 1032 the W-AGF 306 generates and sends identify request 1034 to type A device 2 538. In step 1036 type A device 2 538 receives the identify request 1040, and in response in step 1038 type A device 2 538 generates and sends identify response 1040 to the W-AGF 306. In step 1032 the W-AGF 306 receives the identify response 1040, and recovers the communicated information.

In step 1044 the W-AGF 306 determines, based on the received information in identify response 1040, that the response was acceptable, generates a 5GC registration request message 1046 and sends the 5GC registration request 1046 to the AMF 308. This registration request message 1046 include a new indication that non AKA type authentication is requested. The AMF 308 in step 1048 receives the registration request message 1046, and in response, in step 1050 generates and sends registration request message 1051, which is a forwarded copy of message 1046, to AUSF 692.

In step 1054 an EAP based authentication procedure is performed under the direction of the AUSF 692. Step 1054 includes steps 1056, 1057 and 1058. In step 1056 type-A device 2 538 receives and sends EAP based authentication procedure signals 1060 from/to AUSF 692. In step 1057 the residential gateway 302 use the first set of reserved resources to communicate one or more EAP authentication messages as part of the EAP authentication procedure (1054) for a second user device (538) of the first type (Type A Device 2). In step 1058 AUSF 692 sends and receives EAP based authentication procedure signals 1060 from/to type-A device 2 538. In step 1062 AUSF 692 determines that the authentication is successful, generates success message 1062, and sends the success message 1062 to AMF 308. In step 1068 the AMF 308 receives the success message 1064. In step 1068 the AMF 308, in response to the received success message 1064, generates and sends a registration accepted message 1072 to the W-AGF 306. In step 1074, the W-AGF 306 receives the registration accepted message 1072. In step 1076, the W-AGF 306, in response to the received registration accepted message 1072, generates and sends an EAP success message 1078 to type A device 2 538. In step 1080 the type-A device 2 538 receives the EAP success message 1078.

When authentication is successful, W-AGF 306 initiates a PDU session on behalf of this UE, which is type A device 2 538, similar to the PDU session establishment of step 616. Thus in step 1082, PDU session establishment operations are performed. Step 1082 includes step 1084, 1086, step 1090, and step 1092. In step 1084 the W-AGF 306 sends and receives PDU session establishment signals 1088. The PDU session establishment signals 1088 include a signal sent by the W-AGF to initiate a PDU session on behalf of type A device 2 538. In step 1086 the AMF 308 receives and sends PDU session establishment signals 1088. In step 1090 the AMF 308 sends and receives session establishment signals 1094. In step 1092 the SMF/UPF 309 receives and sends session establishment signals 1094.

Thus, in step 1084 the W-AGF 306 initiates a PDU session establishment request (one of signals 1088) to establish a user-plane tunnel between W-AGF 306 and UPF of SMF/UPF 309. This follows the procedure defined in TS 23.316, section 7.3.4-1. The user plane tunnel 1098, designated as user plane tunnel #N3, is established between W-AGF 306 and UPF of SMF/UPF 309 for that FN-RG 302 to be used by type A device 2 538. W-AGF 302 in step 1085 reserves the DOCSIS resources 1096 by creating (or mapping) a service flow, e.g., service flow SF3, based on the QoS information received from the N2.

A UE performed DHCP request is used to obtain an IP address over the user-plane. In step 10902, type A device 2 538 generates sends L2 frame/DHCP request 10904, requesting an IP assignment, to W-AGF 306, which is received by the W-AGF 306 in step 10906. In step 10908 the W-AGF 306 generates and sends DHCP request 10910 over user plane tunnel #N3 1098 to SMF/UPF 309. In step 10912 the SMF/UPF 309 receives the DHCP request 10910 and recovers the communicated information, and processes the request, said processing including operating the SMF to assign an IP address to type A device 2 538. In step 10914 the SMF/UPF 309 generates and sends a DHCP response 10916 over user plane tunnel #N3 1098 to the W-AGF 306, which is received in step 10917. In step 10918 the W-AGF 306 generates and sends L2 frame/DHCP response 10920 to type A device 2 538. In step 10922 type A device 2 538 receives the L2 frame/DHCP response 10920 and recovers the communicated information including the SMF assigned IP address. Thus in step 10907 which includes steps 10906 and 10918 the third set of reserved resources is used to communicate the third DHCP request (10904) and a third DHCP response (10920) for the second user device (538) of the first type (Type A Device 2) between the residential gateway 302 and W-AGF 306 as part of communicating the messages from/to the second type A device 538.

In step 10919 which includes steps 10908 and 10917 the N3 user plane tunnel is used to communicate the DCHP request message 10910 and DCHP response 10916 corresponding to the second type A device 538. between the access gateway 306 and user plane function device 309.

As the result of receiving the REG accept 1072 in step 1074, W-AGF 306 then, creates a new PDU session with a new N3 tunnel (user plane tunnel #N3 1098) and service flow (SF 3) to this type-A device (type A device 2 538), resulting in the following overall user-plane relationship shown in FIG. 12.

Figure 12:
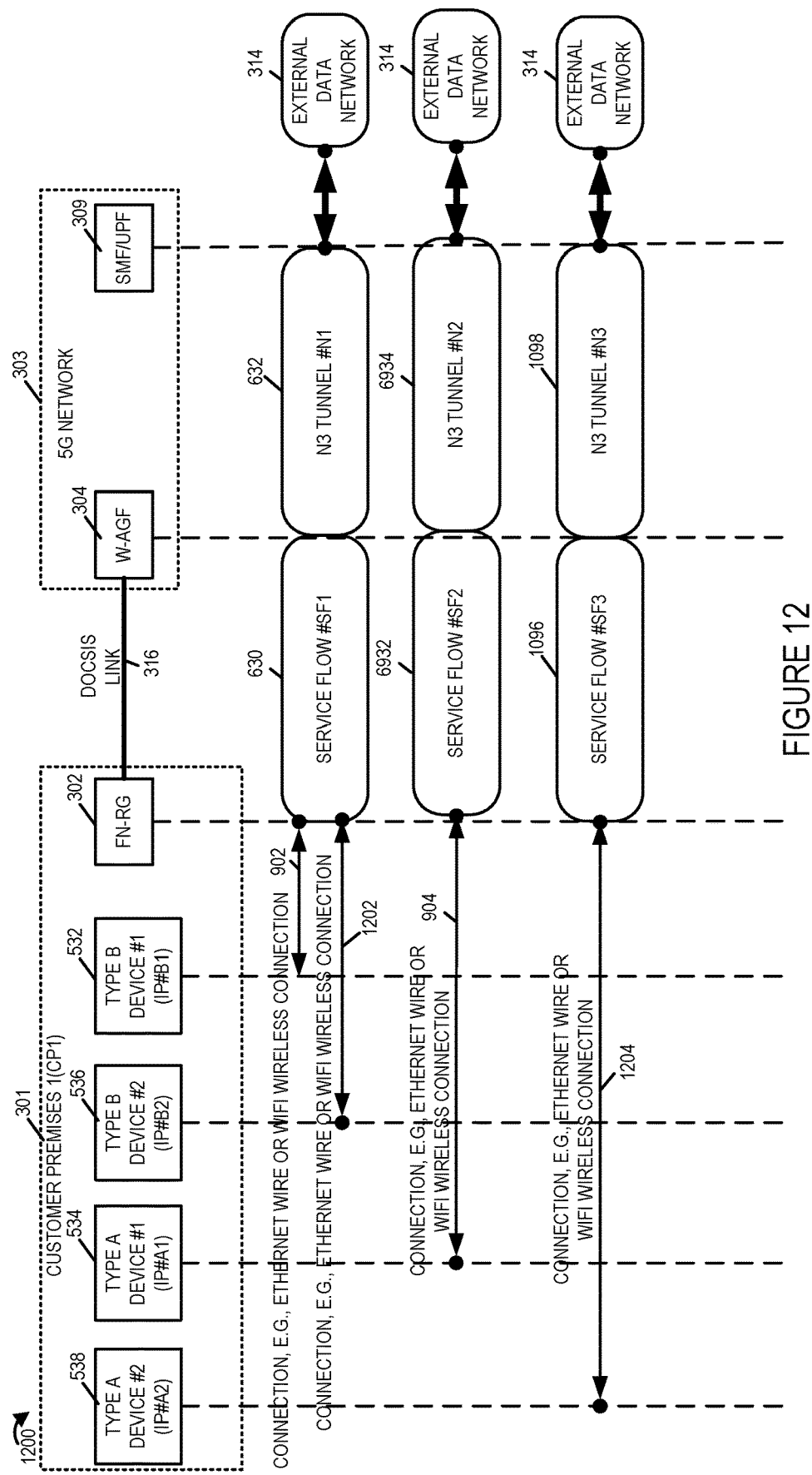
FIG. 12 shows the relationship of service flows and the user plane tunnels between a W-AGF, and a UPF of a SMF/UPF device for multiple type-B devices and multiple type-A devices.

Drawing 1200 of FIG. 12 shows the relationship of the user plane tunnels between W-AGF 306, and UPF of SMF/UPF 309 for multiple type-B devices (Type B device 1 532, Type B device 2 536) and multiple type A devices (type A device 1 534, Type A device 2 538) with regard to service flows, DOCSIS resources, and Ethernet connections. Connection 902, e.g., an Ethernet wire or WiFi wireless connection, couples type B device 1 532 with IP address IP #B1, to FN-RG 302. Connection 1202, e.g., an Ethernet wire or WiFi wireless connection, couples type B device 2 536 with IP address IP #B2, to FN-RG 302. Service flow #SF1 is between FN-RG 302 and W-AGF 304 using DOCSIS resource 630. N3 tunnel #N1 632 is between W-AGF 304 and UPF of SMF/UPF 309. The UPF is coupled to an external data network 314. Connection 904, e.g., an Ethernet wire or WiFi wireless connection, couples type A device 1 534 with IP address IP #A1, to FN-RG 302. Service flow #SF2 is between FN-RG 302 and W-AGF 304 using DOCSIS resource 6932. N3 tunnel #N2 6934 is between W-AGF 304 and UPF of SMF/UPF 309. The UPF is coupled to an external data network 314. Connection 1204, e.g., an Ethernet wire or WiFi wireless connection, couples type A device 2 538 with IP address IP #A2, to FN-RG 302. Service flow #SF3 is between FN-RG 302 and W-AGF 304 using DOCSIS resource 1096. N3 tunnel #N3 1098 is between W-AGF 304 and UPF of SMF/UPF 309. The UPF is coupled to an external data network 314.

Figure 11:
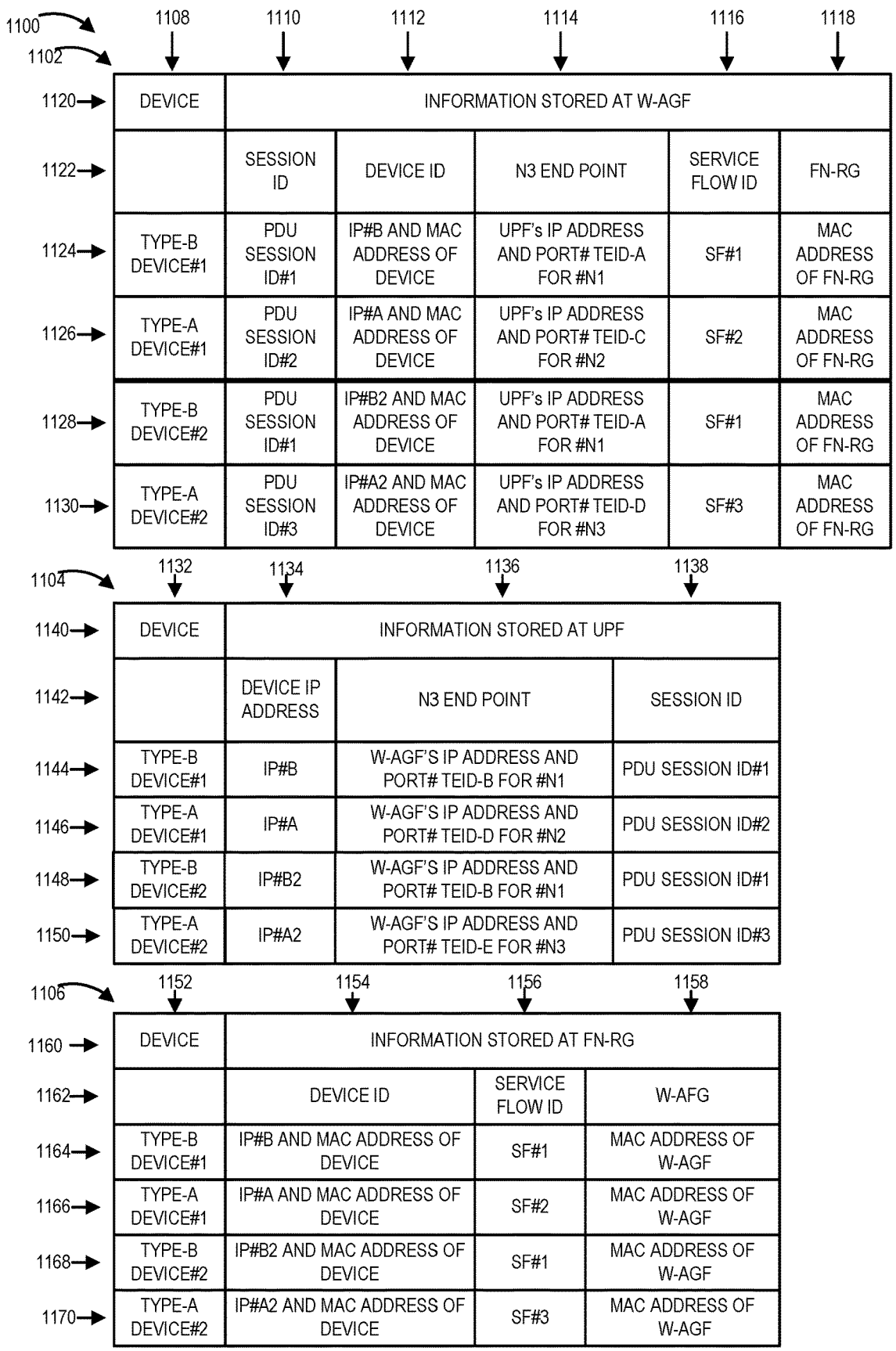
FIG. 11 is a drawing illustrating exemplary correlation tables including information for the first type-B device, information for the first type-A device, information for the second type-B device, and information for the second type-A device, which are created as part of the operations of the flow of FIG. 6 and FIG. 10.

The resulting tables (1102, 1104, 1106) being stored in the W-AGF 306, UPF of SMF/UPF 309, and FN-RG 302, respectively, are shown in drawing 1100 of FIG. 11. The correlation tables (1102, 1104 and 1106) of FIG. 11 are updated versions of the correlation table (802, 804, 806), respectively of FIG. 8, e.g., following completion of the steps of FIG. 10.

FIG. 11 is a drawing 1100 illustrating exemplary correlation tables1102, 1104, 1106 including information for type-B device 1 532, information for type-A device 1 534, information for type-B device 2 536, and information for type-A device 2 538 which are created as part of the operations of the flow of FIG. 6 and FIG. 10.

Correlation table 1102 represents information stored at W-AGF 306. Column 1108 is the device column, which identifies the particular device to which a set of information stored at the W-AGF corresponds (a set of information on one row of the table 1102 corresponds). Column 1110 includes session ID information. Column 1112 includes device ID information. Column 1114 includes N3 endpoint information. Column 1116 includes service flow ID information. Column 1118 includes FN-RG information. Row 1120 identifies column 1108 as a device column and columns (1110, 1112, 1114, 1116, 1118) as columns used to store sets of information, corresponding to devices, in the W-AGF. Row 1122 includes labels for each of the information columns (1110, 1112, 1114, 1116, 1118). Row 1124 indicates that for type-B device 1 532: the session ID=PDU Session ID #1, the device ID=IP #B and the MAC address of type-B device #1, N3 end point=UPF's IP address and port #TEID-A for #N1, the service flow ID=SF #1, and FN-RG identification information=MAC address of FN-RG 302. Row 1126 indicates that for type-A device 1 534: the session ID=PDU Session ID #2, the device ID=IP #A and the MAC address of type-A device #1, N3 end point=UPF's IP address and port #TEID-C for #N2, the service flow ID=SF #2, and FN-RG identification information=MAC address of FN-RG 302. Row 1128 indicates that for type-B device 2 536: the session ID=PDU Session ID #1, the device ID=IP #B2 and the MAC address of type-B device #2, N3 end point=UPF's IP address and port #TEID-A for #N1, the service flow ID=SF #1, and FN-RG identification information=MAC address of FN-RG 302. Row 1130 indicates that for type-A device 2 538: the session ID=PDU Session ID #3, the device ID=IP #A2 and the MAC address of type-A device #2, N3 end point=UPF's IP address and port #TEID-D for #N3, the service flow ID=SF #3, and FN-RG identification information=MAC address of FN-RG 302.

Correlation table 1104 represents information stored at the UPF of SMF/UPF 309. Column 1132 is the device column, which identifies the particular device to which a set of information stored at the UPF corresponds (a set of information on one row of the table 1104 corresponds). Column 1134 includes device IP address information. Column 1136 includes N3 endpoint information. Column 1138 includes session ID information. Row 1140 identifies column 1132 as a device column and columns (1134, 1136, 1138) as columns used to store sets of information, corresponding to devices, in the UPF. Row 1142 includes labels for each of the information columns (1134, 1136, 1138). Row 1144 indicates that for type-B device 1 532: the device IP address=IP #B, N3 end point=W-AGF's IP address and port #TEID-B for #N1, the session ID=PDU session ID #1. Row 1146 indicates that for type-A device 1 534: the device IP address=IP #A, N3 end point=W-AGF's IP address and port #TEID-D for #N2, the session ID=PDU session ID #1. Row 1148 indicates that for type-B device 2 536: the device IP address=IP #B2, N3 end point=W-AGF's IP address and port #TEID-B for #N1, the session ID=PDU session ID #1. Row 1150 indicates that for type-A device 2 538: the device IP address=IP #A2, N3 end point=W-AGF's IP address and port #TEID-E for #N3, the session ID=PDU session ID #3.

Correlation table 1106 represents information stored at FN-RG 302. Column 1152 is the device column, which identifies the particular device to which a set of information stored at the FN-RG corresponds (a set of information on one row of the table 1106 corresponds). Column 1154 includes device IP information. Column 1156 includes service flow ID information. Column 1158 includes W-AGF information. Row 1160 identifies column 1152 as a device column and columns (1154, 1156, 1158) as columns used to store sets of information, corresponding to devices, in the FN-RG. Row 1162 includes labels for each of the information columns (1154, 1156, 1158). Row 1164 indicates that for type-B device 1 532: the device IP information=IP #B and the MAC address of type-B device #1 532, service flow=SF #1, and the W-AGF information=the MAC address of W-AGF 304. Row 1166 indicates that for type-A device 1 534: the device IP information=IP #A and the MAC address of type-A device #1 534, service flow=SF #2, and the W-AGF information=the MAC address of W-AGF 304. Row 1168 indicates that for type-B device 2 536: the device IP information=IP #B2 and the MAC address of type-B device #2 536, service flow=SF #1, and the W-AGF information=the MAC address of W-AGF 304. Row 1150 indicates that for type-A device 2 538: the device IP information=IP #A2 and the MAC address of type-A device #2 538, service flow=SF #3, and the W-AGF information=the MAC address of W-AGF 304.

A new PDU session ID (#3) is created by W-AGF in step 1082 to identify the new PDU session within the 5G system. In step 1082 N3 tunnel #N3 1098 is created. New TED is used to identify the new N3 tunnel (#N3) 1098 and a new service flow (SF #3) is also created between the W-AGF and FN-RG for Type-A device 2 538, as indicated by DOCSIS resource 1096.

Figure 13:
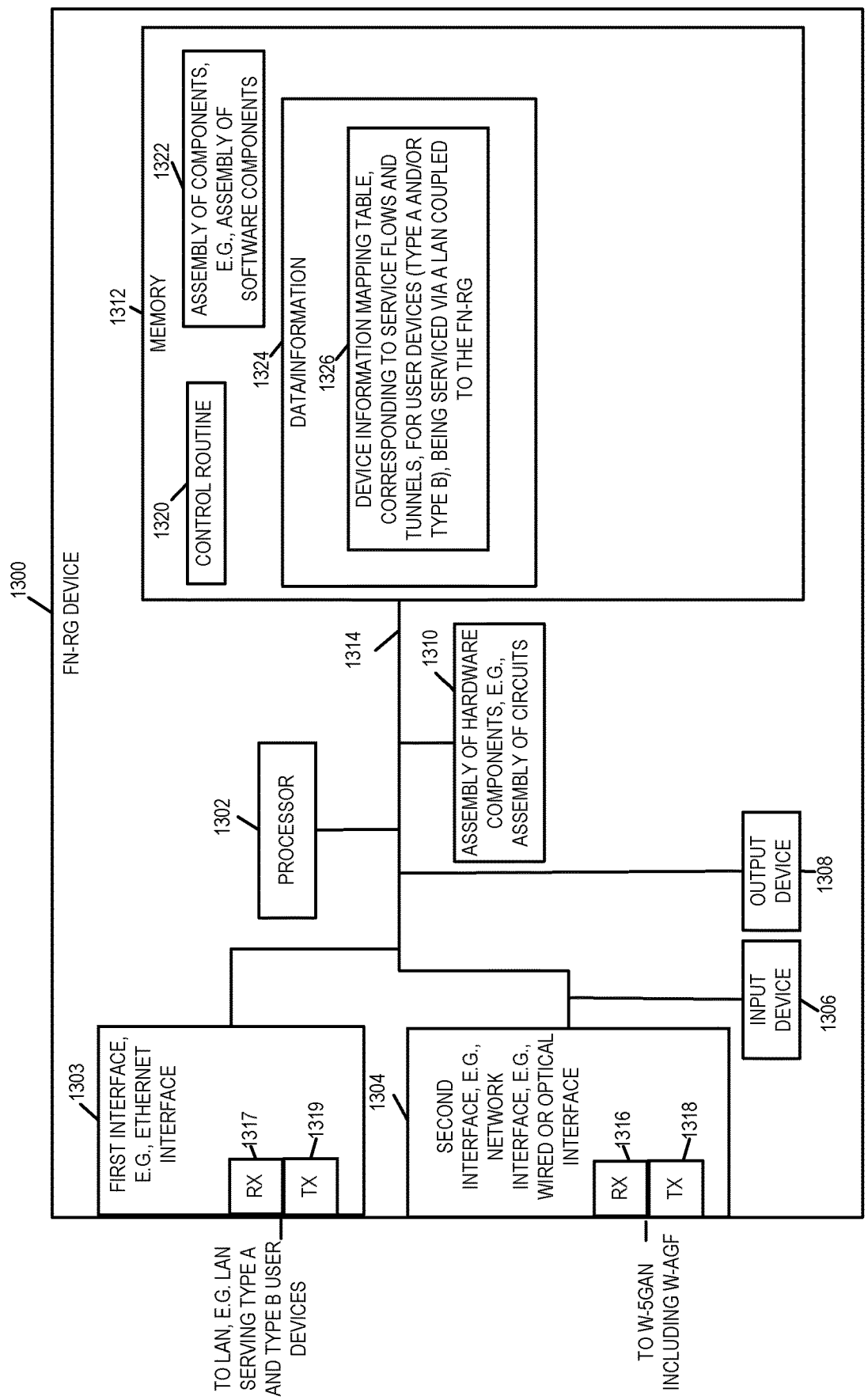
FIG. 13 is a drawing of an exemplary Fixed Network-Residential Gateway (FN-RG) device in accordance with an exemplary embodiment.

FIG. 13 is a drawing of an exemplary Fixed Network-Residential Gateway (FN-RG) device 1300 in accordance with an exemplary embodiment. FN-RG device 1300 is, e.g., FN-RG 302 of FIGS. 3-6 and 10. FN-RG device 1300 includes a processor 1302, a first interface 1303, e.g., an Ethernet interface, and second interface 1304, e.g., a network interface, an input device 1306, e.g., a keyboard, an output device 1308, e.g., a display, an assembly of hardware components 1310, e.g., an assembly of circuits, and memory 1312 coupled together via a bus 1314 over which the various elements (1302, 1303, 1304, 1306, 1308, 1310, 1312) may interchange data and information. First interface 1303 includes a receiver 1317 and a transmitter 1310. First interface 1303 is, e.g., coupled to a LAN, e.g. a LAN serving type A and type B user devices. Second interface 1304 includes a receiver 1316 and a transmitter 1318. Second interface 1304 is, e.g., coupled to a W-5GAN including a W-AGF.

Memory 1312 includes a control routine 1320, an assembly of components 1322, e.g., an assembly of software components, and data/information 1324. Data/information 1324 includes a device information mapping table 1326 corresponding to service flows and tunnels for user devices (type A and type B) being served via a LAN coupled to the FN-RG.

Figure 14:
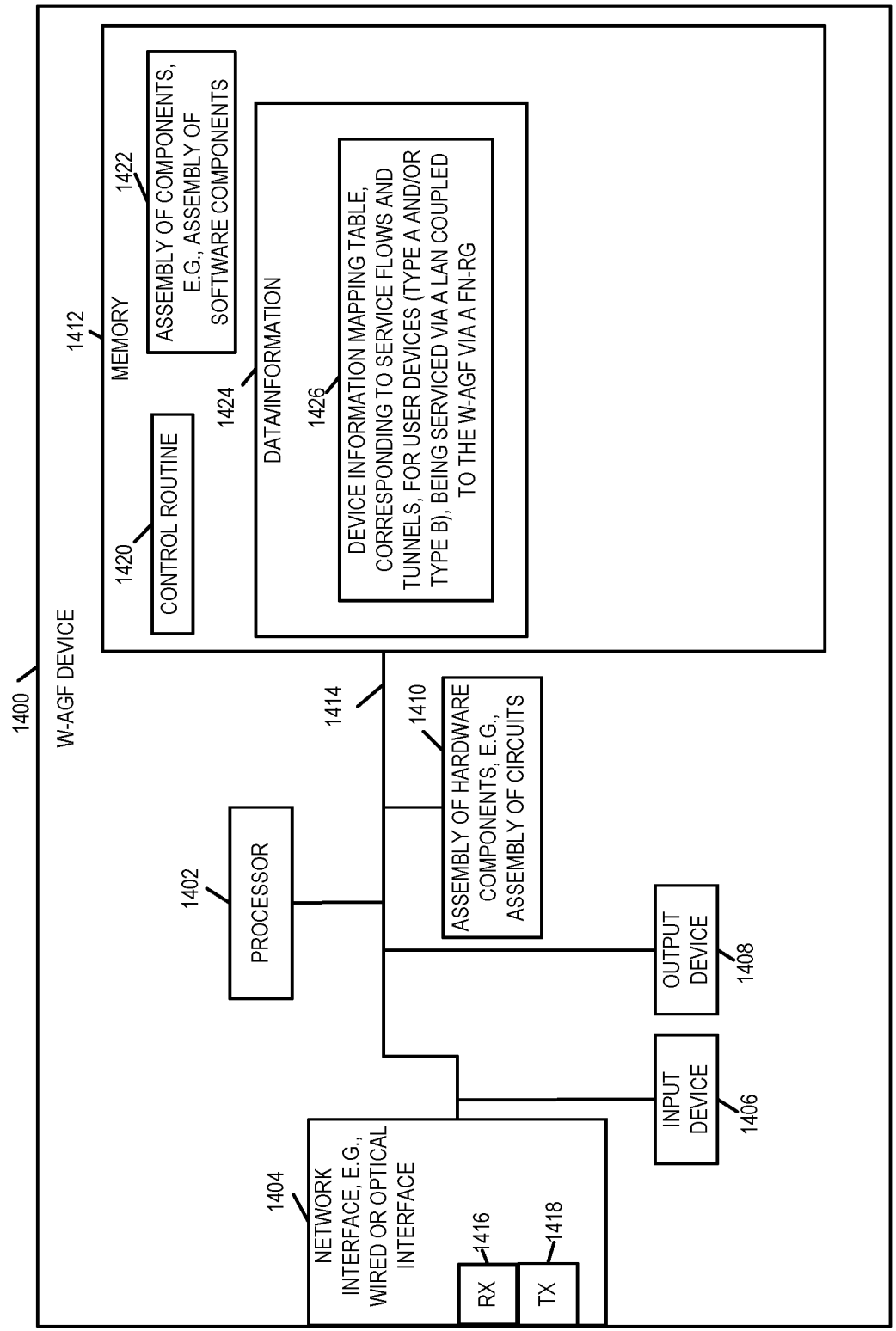
FIG. 14 is a drawing of an exemplary Wireline Access Gateway Function (W-AGF) device in accordance with an exemplary embodiment.

FIG. 14 is a drawing of an exemplary wireline access gateway function (W-AGF) device 1400 in accordance with an exemplary embodiment. W-AGF device 1400 is, e.g., W-AGF device 306 of FIGS. 3-6 and 10. W-AGF device 1400 includes a processor 1402, a network interface 1404, e.g., a wired or optical interface, an input device 1406, e.g., a keyboard, an output device 1408, e.g., a display, an assembly of hardware components 1410, e.g., an assembly of circuits, and memory 1312 coupled together via a bus 1414 over which the various elements (1402, 1404, 1406, 1408, 1410, 1412) may interchange data and information. Network interface 1404 includes a receiver 1416 and a transmitter 1418.

Memory 1412 includes a control routine 1420, an assembly of components 1422, e.g., an assembly of software components, and data/information 1424. Data/information 1424 includes a device information mapping table 1426 corresponding to service flows and tunnels for user devices (type A and type B) being served via a LAN coupled to the W-AGF via a FN-RG.

Figure 15:
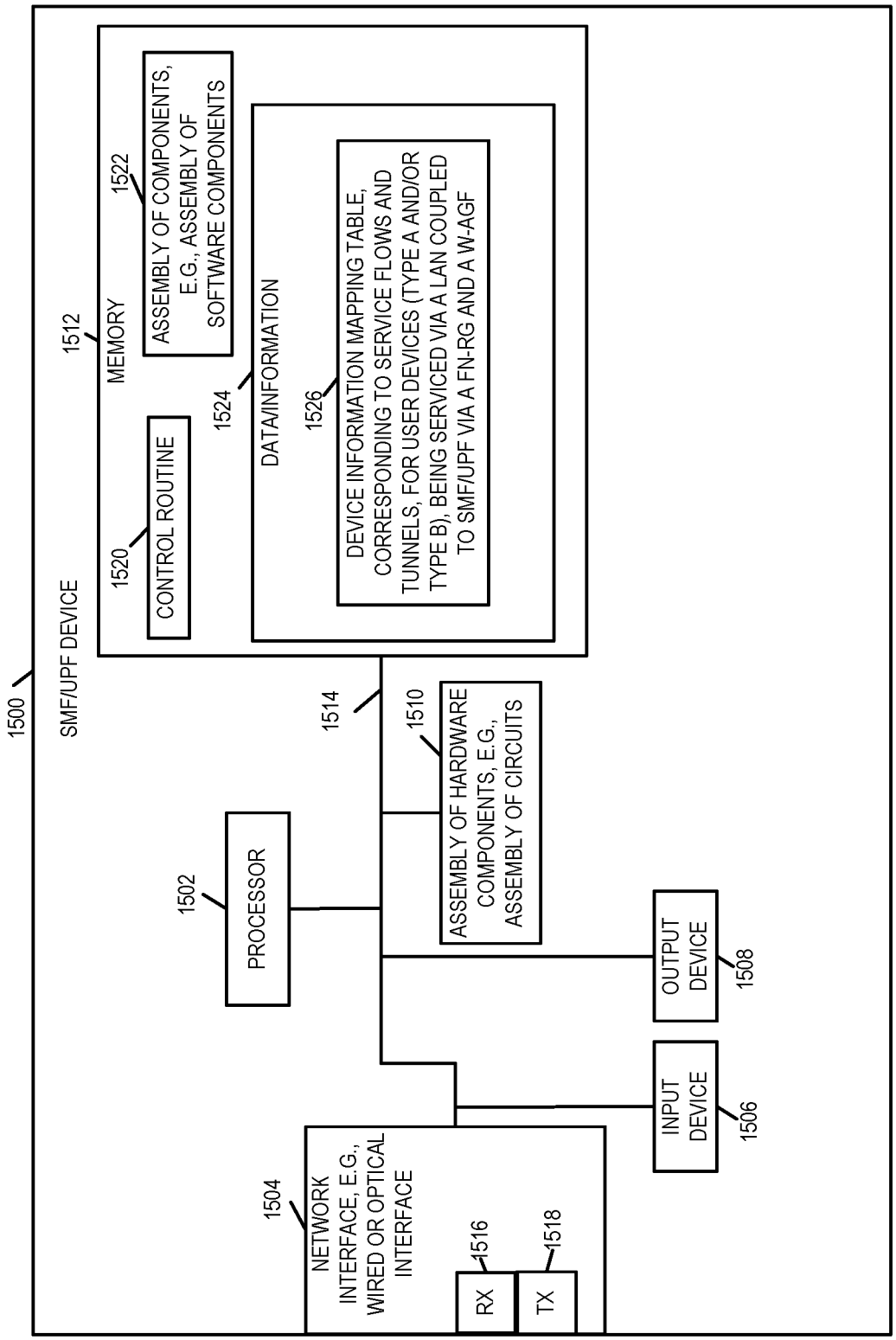
FIG. 15 is a drawing of an exemplary SMF/UPF (session management function/user plane function) device in accordance with an exemplary embodiment.

FIG. 15 is a drawing of an exemplary Session Management Function/User Plane Function (SMF/UPF) device 1500 in accordance with an exemplary embodiment. SMF/UPF device 1500 is, e.g., SMF/UPF device 309 of FIGS. 3-6 and 10. SMF/UPF device 1500 includes a processor 1502, a network interface 1504, e.g., a wired or optical interface, an input device 1506, e.g., a keyboard, an output device 1508, e.g., a display, an assembly of hardware components 1510, e.g., an assembly of circuits, and memory 1512 coupled together via a bus 1514 over which the various elements (1502, 1504, 1506, 1508, 1510, 1512) may interchange data and information. Network interface 1504 includes a receiver 1516 and a transmitter 1518.

Memory 1512 includes a control routine 1520, an assembly of components 1522, e.g., an assembly of software components, and data/information 1524. Data/information 1524 includes a device information mapping table 1526 corresponding to service flows and tunnels for user devices (type A and type B) being served via a LAN coupled to the SMF/UPF via a FN-RG and a W-AGF.

Figure 16:
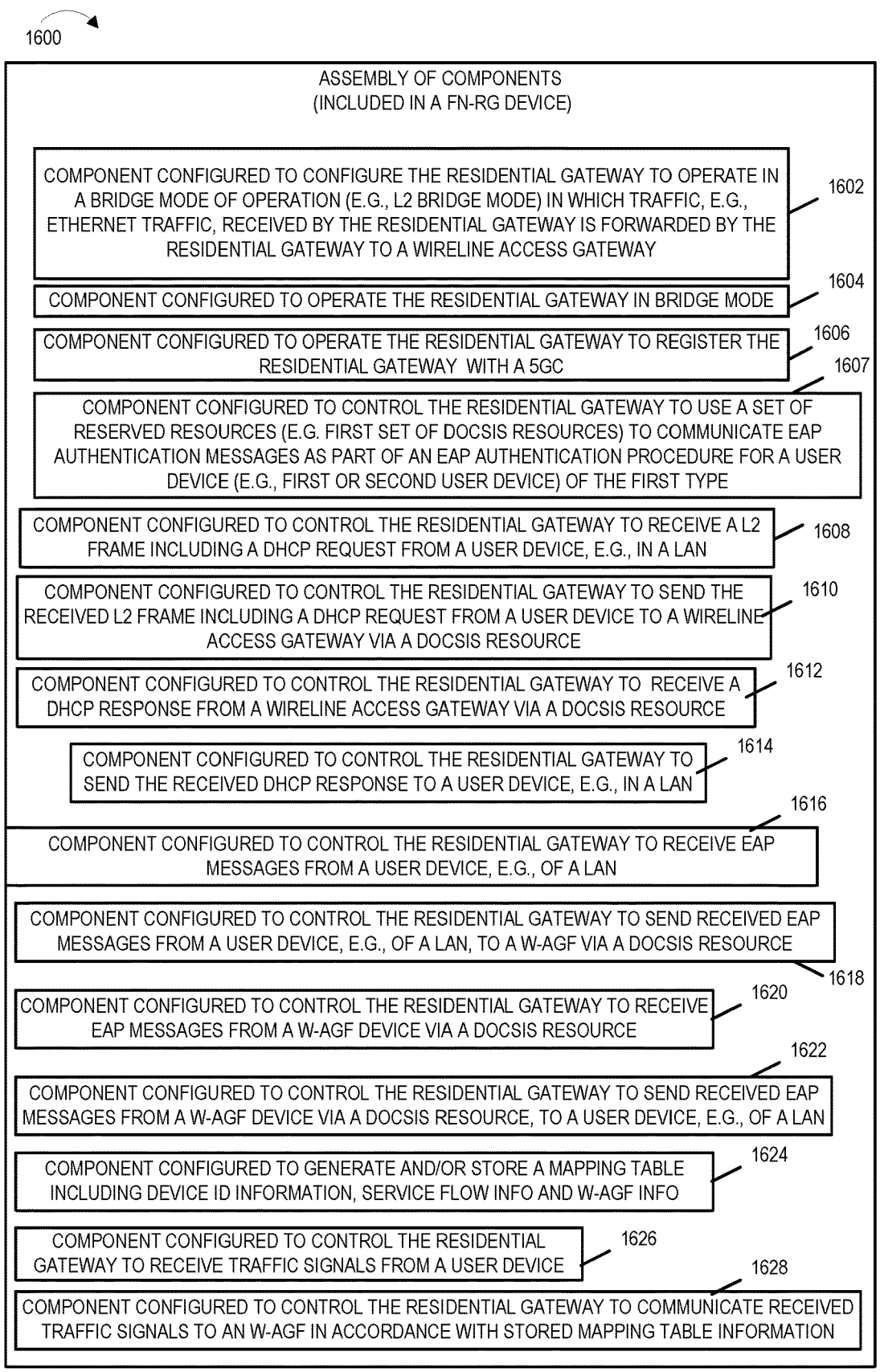
FIG. 16 is a drawing of an exemplary assembly of components which may be included in an exemplary Fixed Network-Residential Gateway (FN-RG) device in accordance with an exemplary embodiment.

FIG. 16 is a drawing of an exemplary assembly of components 1600 which may be included in an exemplary Fixed Network-Residential Gateway (FN-RG) device, e.g., FN-RG device 1300 of FIG. 13 and/or FN-RG device 302 of FIGS. 3-6 and 10, in accordance with an exemplary embodiment. The components in the assembly of components 1600 can, and in some embodiments are, implemented fully in hardware within a processor, e.g., processor 1302, e.g., as individual circuits. The components in the assembly of components 1700 can, and in some embodiments are, implemented fully in hardware within the assembly of hardware components 1310, e.g., as individual circuits corresponding to the different components. In other embodiments some of the components are implemented, e.g., as circuits, within processor 1302 with other components being implemented, e.g., as circuits within assembly of components 1310, external to and coupled to the processor 1302. As should be appreciated the level of integration of components on the processor and/or with some components being external to the processor may be one of design choice. Alternatively, rather than being implemented as circuits, all or some of the components may be implemented in software and stored in the memory 1312 of the FN-RG device 1300, with the components controlling operation of FN-RG device 1300 to implement the functions corresponding to the components when the components are executed by a processor e.g., processor 1302. In some such embodiments, the assembly of components 1600 is included in the memory 1312 as assembly of software components 1322. In still other embodiments, various components in assembly of components 1600 are implemented as a combination of hardware and software, e.g., with another circuit external to the processor providing input to the processor which then under software control operates to perform a portion of a component's function. When implemented in software the components include code, which when executed by a processor, e.g., processor 1302, configure the processor to implement the function corresponding to the component. In embodiments where the assembly of components 1600 is stored in the memory 1312, the memory 1312 is a computer program product comprising a computer readable medium comprising code, e.g., individual code for each component, for causing at least one computer, e.g., processor 1302, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 16 control and/or configure the FN-RG device 1300 or elements therein such as the processor 1302, to perform the functions of corresponding steps illustrated and/or described in the method of one or more of the flowcharts, signaling diagrams and/or described with respect to any of the Figures. Thus the assembly of components 1600 includes various components that perform functions of corresponding one or more described and/or illustrated steps of an exemplary method.

Figure 17A:
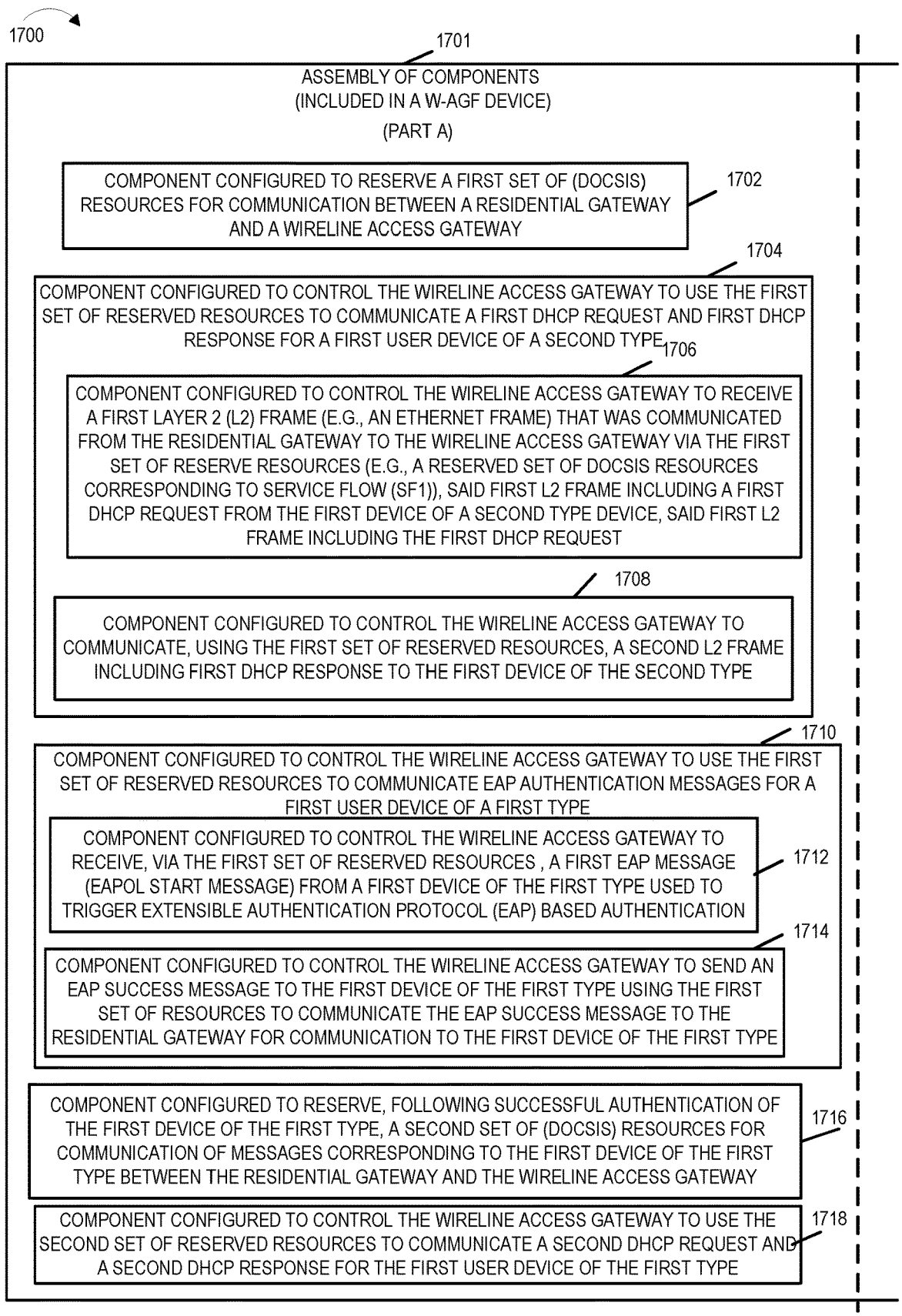
FIG. 17A is a first part of a drawing of an exemplary assembly of components which may be included in an exemplary Wireline Access Gateway Function (W-AGF) device in accordance with an exemplary embodiment.
Figures 17, 17A, 17B:
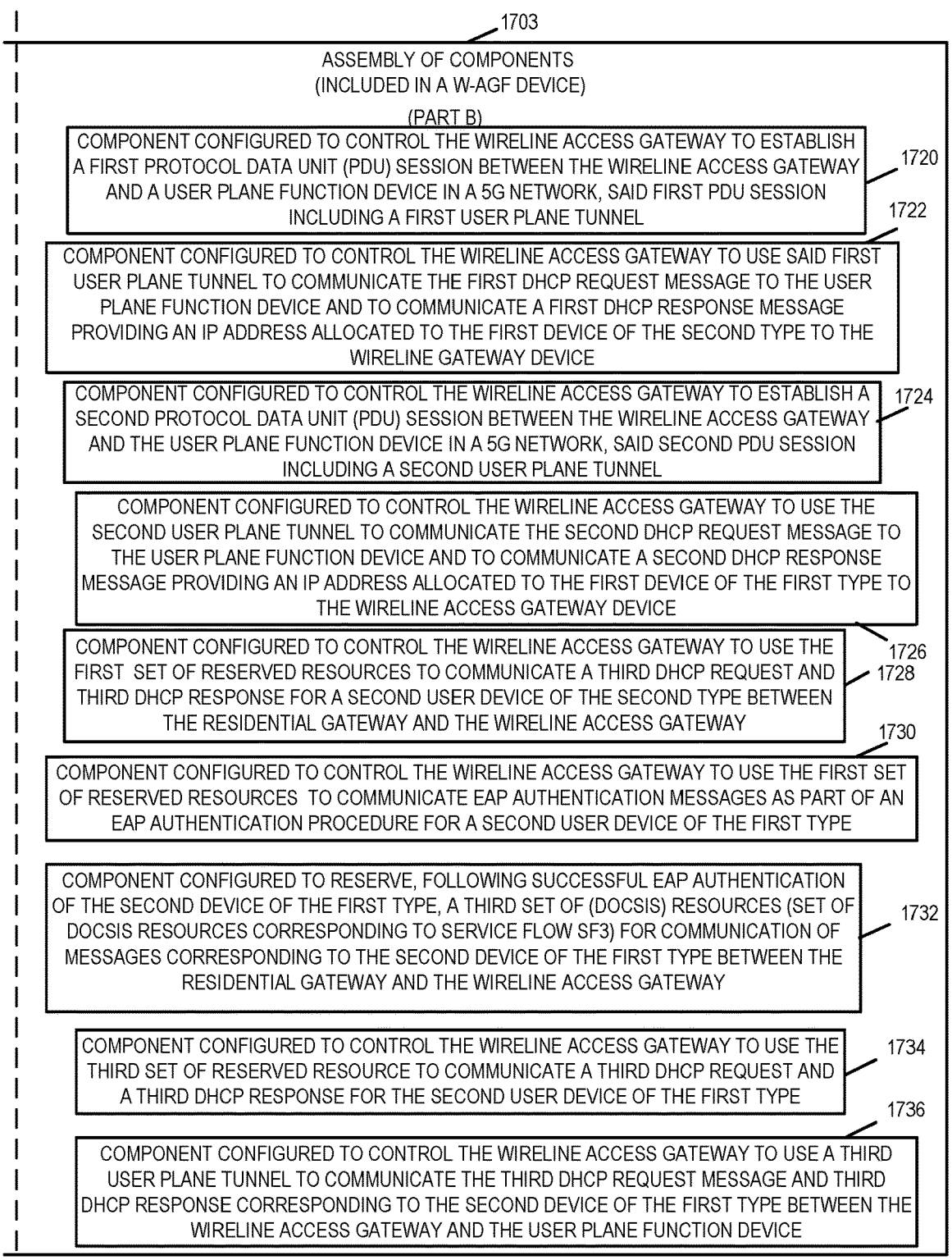
FIG. 17B is a second part of a drawing of an exemplary assembly of components which may be included in an exemplary Wireline Access Gateway Function (W-AGF) device in accordance with an exemplary embodiment.
FIG. 17 comprises the combination of FIG. 17A and FIG. 17B.

Assembly of components 1600 includes a component 1602 configured to configure the residential gateway to operate in a bridge mode of operation, e.g. L2 bridge mode, in which traffic, e.g., Ethernet traffic, received by the residential gateway is forwarded by the residential gateway to a wireline access gateway, a component 1604 configured to operate the residential gateway in bridge mode, a component 1606 configured to operate the residential gateway to register the residential gateway with a 5G Core (5GC), a component 1607 configured to control the residential gateway to use a set of reserved resources, e.g., a first set of DOCSIS resources, to communicate EAP authentication messages as part of an EAP authentication procedure for a user device, e.g., a first or second user device, of the first type, a component 1608 configured to control the residential gateway to receive a L2 frame including a DHCP request from a user device, e.g., in a LAN, a component 1610 configured to control the residential gateway to send the received L2 frame including a DHCP request from a user device to a wireline access gateway via a DOCSIS resource, a component 1612 configured to control the residential gateway to receive a DHCP response from a wireline access gateway via a DOCSIS resource, and a component 1614 configured to control the residential gateway to send the received DHCP response to a user device, e.g. in a LAN network. Assembly of components 1600 further includes a component 1616 configured to control the residential gateway to receive EAP messages from a user device, e.g., of a LAN, a component 1618 configured control the residential gateway to send received EAP messages from a user device, e.g., of a LAN, to a wireline access gateway function (W-AGF) device via a DOCSIS resource, a component 1620 configured to control the residential gateway to receive EAP messages from a W-AGF device via a DOCSIS resource, a component 1622 configured to control the residential gateway to send received EAP messages from a W-AGF device, via a DOCSIS resource, to a user device, e.g., of a LAN, a component 1624 configured to generate and/or store a mapping table include device ID information, service flow information and W-AGF information, a component 1626 configured to control the residential gateway to receive traffic signals from a user device, and a component 1628 configured to control the residential gateway to communicate received traffic signals to a W-AGF in accordance with stored mapping information, FIG. 17, comprising the combination of FIG. 17A and FIG. 17B, is a drawing of an exemplary assembly of components 1700, comprising the combination of Part A 1701 and Part B 1703, which may be included in an exemplary Wireline Access Gateway Function (W-AGF) device, e.g., W-AGF device 1400 of FIG. 14, in accordance with an exemplary embodiment. The components in the assembly of components 1700 can, and in some embodiments are, implemented fully in hardware within a processor, e.g., processor 1402, e.g., as individual circuits. The components in the assembly of components 1700 can, and in some embodiments are, implemented fully in hardware within the assembly of hardware components 1410, e.g., as individual circuits corresponding to the different components. In other embodiments some of the components are implemented, e.g., as circuits, within processor 1402 with other components being implemented, e.g., as circuits within assembly of components 1410, external to and coupled to the processor 1402. As should be appreciated the level of integration of components on the processor and/or with some components being external to the processor may be one of design choice. Alternatively, rather than being implemented as circuits, all or some of the components may be implemented in software and stored in the memory 1412 of the W-AGF device 1400, with the components controlling operation of the W-AGF device 1400 to implement the functions corresponding to the components when the components are executed by a processor e.g., processor 1402. In some such embodiments, the assembly of components 1700 is included in the memory 1412 as assembly of software components 1422. In still other embodiments, various components in assembly of components 1700 are implemented as a combination of hardware and software, e.g., with another circuit external to the processor providing input to the processor which then under software control operates to perform a portion of a component's function. When implemented in software the components include code, which when executed by a processor, e.g., processor 1402, configure the processor to implement the function corresponding to the component. In embodiments where the assembly of components 1700 is stored in the memory 1412, the memory 1412 is a computer program product comprising a computer readable medium comprising code, e.g., individual code for each component, for causing at least one computer, e.g., processor 1402, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 17 control and/or configure the W-AGF device 1400 or elements therein such as the processor 1402, to perform the functions of corresponding steps illustrated and/or described in the method of one or more of the flowcharts, signaling diagrams and/or described with respect to any of the Figures. Thus the assembly of components 1700 includes various components that perform functions of corresponding one or more described and/or illustrated steps of an exemplary method.

Assembly of components 1700 includes a component 1702 configured to reserve a first set of (DOCSIS) resources for communication between a residential gateway and a wireline access gateway, a component 1704 configured control the wireline access gateway to use the first set of reserved resources to communicate a first DHCP request and first DHCP response for a first user device of a second type. Component 1704 includes a component 1706 configured to control the wireline access gateway to receive a first layer 2 (L2) frame, e.g. an Ethernet frame, that was communicated from the residential gateway to the wireline access gateway via the first set of reserved resources (e.g., a reserved set of DOCSIS resources corresponding to service flow (SF1), said first L2 frame including a first DHCP request from the first device of a second type, said first L2 frame including the first DHCP request, and a component 1708 configured to control the wireline access gateway to communicate, using the first set of reserved resources, a second L2 frame including the first DHCP response to the first device of second type.

Assembly of components 1700 further includes a component 1710 configured to control the wireline access gateway to use the first set of reserved resources to communicate EAP authentication messages for a first user device of a first type. Component 1710 includes a component 1712 configured to control the wireline access gateway to receive, via the first set of reserved resources, a first EAP message (EAPOL start message) from a first device of the first type to be used to trigger extensible authentication protocol (EAP) based authentication, and a component 1714 configured to control the wireline access gateway to send an EAP success message to a first device of the first type using the first set of reserved. Assembly of components 1700 includes a component 1716 configured to reserve, following successful authentication of the first device of the first type, a second set of (DOCSIS) resources for communications of messages corresponding to the first device of th4efirst type between the residential gateway and the wireline access gateway, and a component 1718 configured to control the wireline access gateway to use the second set of reserved resources to communicate a second DHCP request and a second DHCP response for the first user device of the first type.

Assembly of components 1700 further includes a component 1720 configured to control the wireline access gateway to establish a first protocol data unit (PDU) session between the wireline access gateway and a user plane function device in a 5G network, said first PDU session including a first user plane tunnel, a component 1722 configured to control the wireline access gateway to use said first user plane tunnel to communicate the first DHCP request message to the user plane function device and to communicate a first DHCP response message providing an IP address allocated to the first device of the second type to the wireline access gateway device, a component 1724 configured to control the wireline access gateway to establish a second protocol data unit (PDU) session between the wireline access gateway and the user plane function device in the 5G network, said second PDU session including a second user plane tunnel, a component 1726 configured to control the wireline access gateway to use the second user plane tunnel to communicate the second DHCP request message to the user plane function device and to communications a second DHCP response message providing an IP address allocated to the first device of the first type to the wireline access gateway device, a component 1726 configured to control the wireline access gateway to use the first set of reserved resources to communicate a third DHCP request and third DHCP response for a second user device of the second type between the residential gateway and the wireline access gateway, and a component 1730 configured to control the wireline access gateway to use the first set of reserved resource to communicate EAP authentication messages as part of an EAP authentication procedure for a second user device of the first type.

Assembly of components 1700 further includes a component 1732 configured to reserve, following successful EAP authentication of the second device of the first type, a third set of (DOCSIS) resources (e.g., set of DOCSIS resources corresponding to service flow SF3) for communication of messages corresponding to the second device of the first type between the residential gateway and the wireline access gateway, a component 1734 configured to control the wireline access gateway to use the third set of reserved resources to communicate a third DHCP request and a third DHCP response for the second user device of the first type, and a component 1736 configured to control the wireline access gateway to use a third user plane tunnel to communicate the third DHCP request message and third DHCP response corresponding to the second device of the first type between the wireline access gateway and the user plane function device.

The following example is used to explain advantages and benefits of a subscription service level for a user device which is portable, in accordance with various exemplary embodiments of the present invention.

First consider a scenario in which subscription service level for a user device is not portable, and in which the subscribed bandwidth at a customer premise is shared among the users at the customer premise, e.g. a subscription level is associated with a FN-RG at a particular site and the amount of subscribed bandwidth is shared between users at the site. For example consider an example where:

1) John (user 1 who resides at customer premise A) has a 150 MB/s subscription at his home. He can score high at his game application with that speed/bandwidth. John is happy.
2) John went to Mary's home and Mary (user 2 who resides at customer premise B) only has a 50 MB/s subscription.
3) John (when operating his UE at customer premises B) is only getting a percentage of the 50 MB/s bandwidth at Mary's home. He scores low at his game application due to low speed/bandwidth. John is not happy.

Consider the following alternative scenario, in accordance with various embodiments, of the present invention, in which subscription level is portable. John's devices are treated as Type-A devices. The better alternative which is possible with the inventive method and system is:

1) John has a 150 MB/s subscription at home (CP A). He can score high at his game application with that speed/bandwidth. John is happy.
2) John went to Mary's home (CP B) and Mary only has a 50 MB/s subscription.
3) John's device (while located at CP B) is authenticated by the 5GC using, e.g., username/password. John gets his own bit pipe with 150 MB/s. John is happy.

Numbered List of Exemplary Method Embodiments

Method Embodiment 1 A communications method, the method comprising: reserving (618) a first set of (DOCSIS) resources for communication between a residential gateway (302) and a wireline access gateway (306); using (641) the first set of reserved resources to communicate a first DHCP request (640) and first DHCP response (658) for a first user device (532) of a second type (Type B device 1); using (6913) the first set of reserved resources to communicate EAP authentication messages (664 through 6914) for a first user device (534) of a first type (Type A device 1); reserving (6921), following successful EAP authentication of the first device (534) of the first type, a second set of (DOCSIS) resources for communication of messages corresponding to the first device of the first type between the residential gateway (302) and the wireline access gateway (306); and using (6955) the second set of reserved resources to communicate a second DHCP request (6940) and second DHCP response (6958) for the first user device (534) of the first type (Type A device 1).

Method Embodiment 2 The method of Method Embodiment 1, wherein said first set of resources is a first set of DOCSIS resources.

Method Embodiment 3 The method of Method Embodiment 2, wherein said second set of resources is a second set of DOCSIS resources.

Method Embodiment 4 The method of Method Embodiment 1, further comprising, prior to using (641) the first set of reserved resources to communicate a first DHCP request (640) and first DHCP response (658) for a first user device (532) of a second type (Type B device 1), performing the step of: configuring (step 636) the residential gateway (FN-RG 302) to operate in a bridge mode of operation (e.g., L2 Bridge mode) in which traffic (e.g., Ethernet traffic) received by the residential gateway (302) is forwarded by the residential gateway (302) to a wireline access gateway (306).

Method Embodiment 5 The method of Method Embodiment 4, wherein devices of said second type do not support EAP authentication.

Method Embodiment 6 The method of Method Embodiment 4, wherein devices of said second type support WiFi authentication but do not support EAP authentication.

Method Embodiment 7 The method of Method Embodiment 4, wherein devices of the second type support local air interface encryption (e.g., using Wi-Fi Protected Access II (WPA/2) with a shared-password) but do not support 802.1x authentications (e.g., EAP-TLS certificate based authentication or EAP-TTLS user-name/Password authentication).

Method Embodiment 8 The method of Method Embodiment 5, wherein devices of the first type support EAP authentication.

Method Embodiment 9 The method of Method Embodiment 7, wherein devices of the first type support perform 802.1x authentications (e.g., EAP-TLS certificate based authentication or EAP-TTLS user-name/Password authentication).

Method Embodiment 10 The method of Method Embodiment 4, wherein using (641) the first set of reserved resources to communicate a first DHCP request (640) and first DHCP response (658) for a first user device (532) of a second type (Type B device 1) includes: receiving (642) at the wireline access gateway (306) a first Layer 2 (L2) frame (e.g., an Ethernet frame) that was communicated from said residential gateway (302) to the wireline access gateway (306) via the first set reserved resources (e.g., a reserved DOC SIS resources corresponding to Service Flow (SF1)), said first L2 frame including a first DHCP request from the first device (Device 1 532) of a second type device, said first L2 frame including the first DHCP request; and communicating (656), using the first set of reserved resources, a second L2 frame including a first DHCP response (658) to the first device (532) of the second type (e.g., DHCP response (658) is communicated from wireline access gateway (306) to residential gateway (302) via said first set of reserved DOCSIS resources and then communicating the DHCP response to the first Type B device 532).

Method Embodiment 11 The method of Method Embodiment 10, further comprising: establishing (616) a first protocol data unit (PDU) session between the wireline access gateway (306) and a user plane function device (309) in a 5G network (303), said first protocol data unit session including a first user plane tunnel (632); and using (645) the first user plane tunnel to communicate the first DHCP request message (646) to the user plan function device (309) and to communicate a first DHCP response message (652) providing an IP address allocated to the first device (532) of the second type to the wireline access gateway device (306).

Method Embodiment 12 The method of Method Embodiment 10, wherein using (6913) the first set of reserved resources to communicate EAP authentication messages (664 through 6914) for a first user device (534) of a first type (Type A device 1) includes: receiving (666), via the first set of reserved resources, at the wireline access gateway (306), a first EAP message (EAPOL START message 664) (from the residential gateway 302 which originated) from a first device (534) of a first type (Type A device which is a device which supports EAP authentication and/or authorization) used to trigger extensible authentication protocol (EAP) based authentication; and sending (6912) an EAP success message (6914) to the first device (534) of the first type using the first set of resources to communicate the EAP success message (6914) to the residential gateway (302) for communication to the first device (534) of the first type (Type A).

Method Embodiment 13 The method of Method Embodiment 12, further comprising: establishing (6918) a second protocol data unit session between the wireline access gateway (306) and the user plane function device (309) in the 5G network (303), said second protocol data unit session including a second user plane tunnel (6934); and using (6945) the second user plane tunnel to communicate the second DHCP request message (6946) to the user plan function device (309) and to communicate a second DHCP response message (6952) providing an IP address allocated to the first device (534) of the first type to the wireline access gateway device (306).

Method Embodiment 14 The method of Method Embodiment 12, wherein the second set of resources is a dedicated set of DOCSIS resources reserved for use by communications corresponding to the first device (534) of the first type (Type A).

Method Embodiment 15 The method of Method Embodiment 14, wherein the first device (534) of the first type and the first device (532) of the second type are located at a first customer premises (CP1 301); wherein said first set of resources is a set of DOCSIS resources reserved for use by devices at said first customer premises which have not completed an EAP authentication procedure, devices at said first customer premises which have not completed an EAP authentication procedure sharing said first set of reserved resources.

Method Embodiment 16 The method of Method Embodiment 15, further comprising: wherein said first device (534) of the first type device is a device corresponding to a subscriber to services at a customer premises different from the first customer premises and who is visiting said first customer premises, said second set of DOCSIS resources providing a second amount of bandwidth that is larger than a first amount of bandwidth provided by said first set of DOCSIS resources, said first set of DOCSIS resources providing a bandwidth corresponding to a service subscribed to by a resident of said first customer premises.

Method Embodiment 17 The method of Method Embodiment 4, further comprising: using (1005) the first set of reserved resources to communicate a third DHCP request (1004) and third DHCP response (1022) for a second user device (536) of the second type (Type B device 2) between the residential gateway (302) and wireline access gateway (306).

Method Embodiment 18 The method of Method Embodiment 17, further comprising: using (1057) the first set of reserved resources to communicate EAP authentication messages as part of an EAP authentication procedure (1054) for a second user device (538) of the first type (Type A Device 2); reserving (1085), following successful EAP authentication of the second device (538) of the first type a third set of (DOCSIS) resources (set of DOCSIS resources corresponding to SF3) for communication of messages corresponding to the second device (538) of the first type between the residential gate (302) and the wireline access gateway (306); and using (10907) the third set of reserved resources to communicate a third DHCP request (10904) and a third DHCP response (10920) for the second user device (538) of the first type (Type A Device 2).

Method Embodiment 19 The method of Method Embodiment 18, further comprising: using (10919) a third user plane tunnel to communicate the third DHCP request message (10910) and third DHCP response message (10916) corresponding to the second user device (538) of the first type (type A device (538)) between the wireline access gateway (306) and user plane function device (309).

Numbered List of Exemplary System Embodiments

System Embodiment 1 A communications system (500) comprising: a wireline access gateway (306) including a first processor (1402); and wherein said first processor (1402) is configured to: reserve (618) a first set of (DOC SIS) resources for communication between a residential gateway (302) and the wireline access gateway (306); control the wireline access gateway (306) to use (641) the first set of reserved resources to communicate a first DHCP request (640) and first DHCP response (658) for a first user device (532) of a second type (Type B device 1); control the wireline access gateway (306) to use (6913) the first set of reserved resources to communicate EAP authentication messages (664 through 6914) for a first user device (534) of a first type (Type A device 1); reserve (6921), following successful EAP authentication of the first device (534) of the first type, a second set of (DOCSIS) resources for communication of messages corresponding to the first device of the first type between the residential gateway (302) and the wireline access gateway (306); and control the wireline access gateway (306) to use (6955) the second set of reserved resources to communicate a second DHCP request (6940) and second DHCP response (6958) for the first user device (534) of the first type (Type A device 1).

System Embodiment 2 The communications system (500) of System Embodiment 1, wherein said first set of resources is a first set of DOCSIS resources.

System Embodiment 3 The communications system (500) of System Embodiment 2, wherein said second set of resources is a second set of DOCSIS resources.

System Embodiment 4 The communications system (500) of System Embodiment 1, further comprising: said residential gateway (302) including a second processor (1302); and wherein said second processor (1302) is configured to: prior to said wireline access gateway (306) using (641) the first set of reserved resources to communicate a first DHCP request (640) and first DHCP response (658) for a first user device (532) of a second type (Type B device 1), perform the step of: configuring (step 636) the residential gateway (FN-RG 302) to operate in a bridge mode of operation (e.g., L2 Bridge mode) in which traffic (e.g., Ethernet traffic) received by the residential gateway (302) is forwarded by the residential gateway (302) to a wireline access gateway (306).

System Embodiment 5 The communications system (500) of System Embodiment 4, wherein devices (532, 536) of said second type do not support EAP authentication.

System Embodiment 6 The communications system (500) of System Embodiment 4, wherein devices (532, 536) of said second type support WiFi authentication but do not support EAP authentication.

System Embodiment 7 The communications system (500) of System Embodiment 4, wherein devices (532, 536) of the second type support local air interface encryption (e.g., using Wi-Fi Protected Access II (WPA/2) with a shared-password) but do not support 802.1x authentications (e.g., EAP-TLS certificate based authentication or EAP-TTLS user-name/Password authentication).

System Embodiment 8 The communications system (500) of System Embodiment 5, wherein devices (534, 538) of the first type support EAP authentication.

System Embodiment 9 The communications system (500) of System Embodiment 7, wherein devices (534, 538) of the first type support perform 802.1x authentications (e.g., EAP-TLS certificate based authentication or EAP-TTLS user-name/Password authentication).

System Embodiment 10 The communications system (500) of System Embodiment 4, wherein said first processor (1402) is further configured to perform the steps of: controlling the wireline access gateway (306) to receive (642) at the wireline access gateway (306) a first Layer 2 (L2) frame (e.g., an Ethernet frame) that was communicated from said residential gateway (302) to the wireline access gateway (306) via the first set reserved resources (e.g., reserved DOCSIS resources corresponding to Service Flow (SF1)), said first L2 frame including a first DHCP request from the first device (Device 1 532) of a second type device, said first L2 frame including the first DHCP request; and controlling the wireline access gateway (306) to communicate (656), using the first set of reserved resources, a second L2 frame including a first DHCP response (658) to the first device (532) of the second type (e.g., DHCP response (658) is communicated from wireline access gateway (306) to residential gateway (302) via said first set of reserved DOCSIS resources and then communicating the DHCP response to the first Type B device 532), as part of being configured to control the wireline access gateway (306) to use (641) the first set of reserved resources to communicate a first DHCP request (640) and first DHCP response (658) for a first user device (532) of a second type (Type B device 1).

System Embodiment 11 The communications system (500) of System Embodiment 10, wherein said first processor (1402) is configured to: control the wireline access gateway (306) to establish (616) a first protocol data unit (PDU) session between the wireline access gateway (306) and a user plane function device (309) in a 5G network (303), said first protocol data unit session including a first user plane tunnel (632); and control the wireline access gateway (306) to use (645) the first user plane tunnel to communicate the first DHCP request message (646) to the user plan function device (309) and to communicate a first DHCP response message (652) providing an IP address allocated to the first device (532) of the second type to the wireline access gateway device (306).

System Embodiment 12 The communications system (500) of System Embodiment 10, wherein said first processor (1402) is configured to perform the steps of: control the wireline access gateway (306) to receive (666), via the first set of reserved resources, at the wireline access gateway (306), a first EAP message (EAPOL START message 664) (from the residential gateway 302 which originated) from a first device (534) of a first type (Type A device which is a device which supports EAP authentication and/or authorization) used to trigger extensible authentication protocol (EAP) based authentication; and control the wireline access gateway (306) to send (6912) an EAP success message (6914) to the first device (534) of the first type using the first set of resources to communicate the EAP success message (6914) to the residential gateway (302) for communication to the first device (534) of the first type (Type A), as part of being configured to control the wireline access gateway (306) to use (6913) the first set of reserved resources to communicate EAP authentication messages (664 through 6914) for a first user device (534) of a first type (Type A device 1).

System Embodiment 13 The communications system (500) of System Embodiment 12, wherein said first processor (1402) is further configured to: control the wireline access gateway (306) to establish (6918) a second protocol data unit session between the wireline access gateway (306) and the user plane function device (309) in the 5G network (303), said second protocol data unit session including a second user plane tunnel (6934); and control the wireline access gateway (306) to use (6945) the second user plane tunnel to communicate the second DHCP request message (6946) to the user plan function device (309) and to communicate a second DHCP response message (6952) providing an IP address allocated to the first device (534) of the first type to the wireline access gateway device (306).

System Embodiment 14 The communications system (500) of System Embodiment 12, wherein the second set of resources is a dedicated set of DOCSIS resources reserved for use by communications corresponding to the first device (534) of the first type (Type A).

System Embodiment 15 The communications system (500) of System Embodiment 14, wherein the first device (534) of the first type and the first device (532) of the second type are located at a first customer premises (CP1 301); and wherein said first set of resources is a set of DOCSIS resources reserved for use by devices at said first customer premises which have not completed an EAP authentication procedure, devices at said first customer premises which have not completed an EAP authentication procedure sharing said first set of reserved resources.

System Embodiment 16 The communications system (500) of System Embodiment 15, wherein said first device (534) of the first type device is a device corresponding to a subscriber to services at a customer premises different from the first customer premises and who is visiting said first customer premises, said second set of DOCSIS resources providing a second amount of bandwidth that is larger than a first amount of bandwidth provided by said first set of DOCSIS resources, said first set of DOCSIS resources providing a bandwidth corresponding to a service subscribed to by a resident of said first customer premises.

System Embodiment 17 The communications system (500) of System Embodiment 4, wherein said first processor (1402) is further configured to: control the wireline access gateway (306) to use (1005) the first set of reserved resources to communicate a third DHCP request (1004) and third DHCP response (1022) for a second user device (536) of the second type (Type B device 2) between the residential gateway (302) and wireline access gateway (306).

System Embodiment 18 The communications system (500) of System Embodiment 17, wherein said second processor (1302) is further configured to: control the residential gateway (302) to use (1057) the first set of reserved resources to communicate EAP authentication messages as part of an EAP authentication procedure (1054) for a second user device (538) of the first type (Type A Device 2); and wherein said first processor (1402) is further configured to: reserve (1085), following successful EAP authentication of the second device (538) of the first type a third set of (DOCSIS) resources (set of DOCSIS resources corresponding to SF3) for communication of messages corresponding to the second device (538) of the first type between the residential gate (302) and the wireline access gateway (306); and control the wireline access gateway (306) to use (10907) the third set of reserved resources to communicate a third DHCP request (10904) and a third DHCP response (10920) for the second user device (538) of the first type (Type A Device 2).

System Embodiment 19 The communications system (500) of System Embodiment 18, wherein said first processor (1402) is further configured to: control the wireline access gateway (306) to use (10919) a third user plane tunnel to communicate the third DHCP request message (10910) and third DHCP response message (10916) corresponding to the second user device (538) of the first type (type A device (538)) between the wireline access gateway (306) and user plane function device (309).

Numbered List of Exemplary Computer Readable Medium Embodiments:

Non-Transitory Computer Readable Medium Embodiment 1 A non-transitory computer readable medium (1412) including computer executable instructions which when executed by a processor (1402) of a wireline access gateway (306 or 1400) cause the wireline access gateway (306 or 1400) to perform the steps of: reserving (618) a first set of (DOCSIS) resources for communication between a residential gateway (302) and a wireline access gateway (306); using (641) the first set of reserved resources to communicate a first DHCP request (640) and first DHCP response (658) for a first user device (532) of a second type (Type B device 1); using (6913) the first set of reserved resources to communicate EAP authentication messages (664 through 6914) for a first user device (534) of a first type (Type A device 1); reserving (6921), following successful EAP authentication of the first device (534) of the first type, a second set of (DOCSIS) resources for communication of messages corresponding to the first device of the first type between the residential gateway (302) and the wireline access gateway (306); and using (6955) the second set of reserved resources to communicate a second DHCP request (6940) and second DHCP response (6958) for the first user device (534) of the first type (Type A device 1).

Non-Transitory Computer Readable Medium Embodiment 2 A non-transitory computer readable medium (1312) including computer executable instructions which when executed by a processor (1302) of a residential gateway (302 or 1300) cause the residential gateway (302 or 1300) to perform the steps of: configuring (step 636) the residential gateway (FN-RG 302) to operate in a bridge mode of operation (e.g., L2 Bridge mode) in which traffic (e.g., Ethernet traffic) received by the residential gateway (302) is forwarded by the residential gateway (302) to a wireline access gateway (306); and using (1057) the first set of reserved resources to communicate EAP authentication messages as part of an EAP authentication procedure (1054) for a second user device (538) of the first type (Type A Device 2).

The techniques of various embodiments may be implemented using software, hardware and/or a combination of software and hardware. Various embodiments are directed to apparatus, e.g., FN-RG device, W-AGF device, SMF/UPF device, CBSD, user equipment devices, SAS, Serving Gateway, PDN gateway, servers, mobility management entities, network nodes, and/or network equipment devices. Various embodiments are also directed to methods, e.g., method of controlling and/or operating FN-RG devices, W-AGF devices, SMF/UPF devices, CBSD devices, network nodes, SAS, nodes, servers, user equipment devices, controllers, mobility management entities or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of the elements or steps are implemented using hardware circuitry.

In various embodiments devices, servers, nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as FN-RG devices, W-AGF devices, SMF/UPF devices, CBSD, UEs, SAS, macro base stations, eNodeBs, registrars, HSS servers, network service devices, video content servers are configured to perform the steps of the methods described as being performed by the FN-RG devices, W-AGF devices, SMF/UPF devices, CBSD, UEs, SAS, macro base stations, eNodeBs, registrars, HSS servers, network service devices, video content servers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., FN-RG device, W-AGF device, SMF/UPF device, CBSD, UE, SAS, macro base station, eNodeB, registrar, HSS server, network service device, video content server, with a processor which includes a component corresponding to each of the steps of the various described methods performed by the device in which the processor is included. In some but not all embodiments a device, e.g., FN-RG device, W-AGF device, SMF/UPF device, CBSD, UE, SAS, macro base station, eNodeB, registrar, HSS server, network service device, video content server, includes a processor corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a node, FN-RG device, W-AGF device, SMF/UPF device, CBSD, UE, SAS, macro base station, eNodeB, registrar, HSS server, network service device, video content server. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a FN-RG device, W-AGF device, SMF/UPF device, CBSD, UE or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
reserving a first set of resources for communication between a residential gateway and a wireline access gateway;
using the first set of reserved resources to communicate a first DHCP request and first DHCP response for a first user device of a second type;
using the first set of reserved resources to communicate EAP authentication messages for a first user device of a first type;
reserving, following successful EAP authentication of the first user device of the first type, a second set of resources for communication of messages corresponding to the first user device of the first type between the residential gateway and the wireline access gateway; and
using the second set of reserved resources to communicate a second DHCP request and second DHCP response for the first user device of the first type.

2. The method of claim 1, further comprising, prior to using the first set of reserved resources to communicate a first DHCP request and first DHCP response for a first user device of a second type, performing the step of:
configuring the residential gateway to operate in a bridge mode of operation in which traffic received by the residential gateway is forwarded by the residential gateway to a wireline access gateway.

3. The method of claim 2, wherein devices of said second type do not support EAP authentication.

4. The method of claim 3, wherein devices of the first type support EAP authentication.

5. The method of claim 2, wherein using the first set of reserved resources to communicate a first DHCP request and first DHCP response for a first user device of a second type includes:
receiving at the wireline access gateway a first Layer 2 (L2) frame that was communicated from said residential gateway to the wireline access gateway via the first set reserved resources, said first L2 frame including a first DHCP request from the first user device of a second type device, said first L2 frame including the first DHCP request; and
communicating, using the first set of reserved resources, a second L2 frame including a first DHCP response to the first user device of the second type.

6. The method of claim 5, wherein using the first set of reserved resources to communicate EAP authentication messages for a first user device of a first type includes:
receiving, via the first set of reserved resources, at the wireline access gateway, a first EAP message from a first user device of a first type used to trigger extensible authentication protocol (EAP) based authentication; and
sending an EAP success message to the first user device of the first type using the first set of resources to communicate the EAP success message to the residential gateway for communication to the first user device of the first type.

7. The method of claim 6, wherein the second set of resources is a dedicated set of DOCSIS resources reserved for use by communications corresponding to the first user device of the first type.

8. The method of claim 7, wherein the first user device of the first type and the first user device of the second type are located at a first customer premises;
wherein said first set of resources is a set of DOCSIS resources reserved for use by devices at said first customer premises which have not completed an EAP authentication procedure, devices at said first customer premises which have not completed an EAP authentication procedure sharing said first set of reserved resources.

9. The method of claim 8,
wherein said first user device of the first type device is a device corresponding to a subscriber to services at a customer premises different from the first customer premises and who is visiting said first customer premises, said second set of DOCSIS resources providing a second amount of bandwidth that is larger than a first amount of bandwidth provided by said first set of DOCSIS resources, said first set of DOCSIS resources providing a bandwidth corresponding to a service subscribed to by a resident of said first customer premises.

10. The method of claim 2, further comprising:
using the first set of reserved resources to communicate a third DHCP request and third DHCP response for a second user device of the second type between the residential gateway and wireline access gateway.

11. The method of claim 10, further comprising:
using the first set of reserved resources to communicate EAP authentication messages as part of an EAP authentication procedure for a second user device of the first type;
reserving, following successful EAP authentication of the second user device of the first type a third set of resources for communication of messages corresponding to the second user device of the first type between the residential gate and the wireline access gateway; and using the third set of reserved resources to communicate a third DHCP request and a third DHCP response for the second user device of the first type.

12. The method of claim 11, further comprising:
using a third user plane tunnel to communicate the third DHCP request message and third DHCP response message corresponding to the second user device of the first type between the wireline access gateway and user plane function device.

13. A communications system comprising:
a wireline access gateway including a first processor; and
wherein said first processor is configured to:
reserve a first set of resources for communication between a residential gateway and the wireline access gateway;
control the wireline access gateway to use the first set of reserved resources to communicate a first DHCP request and first DHCP response for a first user device of a second type;
control the wireline access gateway to use the first set of reserved resources to communicate EAP authentication messages for a first user device of a first type;
reserve, following successful EAP authentication of the first user device of the first type, a second set of resources for communication of messages corresponding to the first user device of the first type between the residential gateway and the wireline access gateway; and
control the wireline access gateway to use the second set of reserved resources to communicate a second DHCP request and second DHCP response for the first user device of the first type.

14. The communications system of claim 13, further comprising:
said residential gateway including a second processor; and
wherein said second processor is configured to:
prior to said wireline access gateway using the first set of reserved resources to communicate a first DHCP request and first DHCP response for a first user device of a second type, perform the step of:
configuring the residential gateway to operate in a bridge mode of operation in which traffic received by the residential gateway is forwarded by the residential gateway to a wireline access gateway.

15. The communications system of claim 14, wherein devices of said second type do not support EAP authentication.

16. The communications system of claim 15, wherein devices of the first type support EAP authentication.

17. The communications system of claim 14, wherein said first processor is further configured to perform the steps of:
controlling the wireline access gateway to receive at the wireline access gateway a first Layer 2 (L2) frame that was communicated from said residential gateway to the wireline access gateway via the first set reserved resources, said first L2 frame including a first DHCP request from the first user device of a second type device, said first L2 frame including the first DHCP request; and
controlling the wireline access gateway to communicate, using the first set of reserved resources, a second L2 frame including a first DHCP response to the first user device of the second type,
as part of being configured to control the wireline access gateway to use the first set of reserved resources to communicate a first DHCP request and first DHCP response for a first user device of a second type.

18. The communications system of claim 17, wherein said first processor is configured to:
control the wireline access gateway to receive, via the first set of reserved resources, at the wireline access gateway, a first EAP message from a first user device of a first type used to trigger extensible authentication protocol (EAP) based authentication; and
control the wireline access gateway to send an EAP success message to the first user device of the first type using the first set of resources to communicate the EAP success message to the residential gateway for communication to the first user device of the first type,
as part of being configured to control the wireline access gateway to use the first set of reserved resources to communicate EAP authentication messages for a first user device of a first type.

19. The communications system of claim 18, wherein the second set of resources is a dedicated set of DOCSIS resources reserved for use by communications corresponding to the first user device of the first type.

20. A non-transitory computer readable medium including computer executable instructions which when executed by a processor of a wireline access gateway cause the wireline access gateway to perform the steps of:
reserving a first set of resources for communication between a residential gateway and the wireline access gateway;
using the first set of reserved resources to communicate a first DHCP request and first DHCP response for a first user device of a second type;
using the first set of reserved resources to communicate EAP authentication messages for a first user device of a first type;
reserving, following successful EAP authentication of the first user device of the first type, a second set of resources for communication of messages corresponding to the first user device of the first type between the residential gateway and the wireline access gateway; and
using the second set of reserved resources to communicate a second DHCP request and second DHCP response for the first user device of the first type.

* * * * *